US008780678B2

(12) United States Patent
Iwanabe et al.

(10) Patent No.: US 8,780,678 B2
(45) Date of Patent: Jul. 15, 2014

(54) THERMAL-ASSISTED-MAGNETIC-RECORDING HEAD HAVING CORE COVER LAYER

(75) Inventors: Yasuhiko Iwanabe, Kodaira (JP); Takuya Matsumoto, Tokyo (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/392,115

(22) PCT Filed: May 16, 2011

(86) PCT No.: PCT/JP2011/061137
§ 371 (c)(1),
(2), (4) Date: Mar. 20, 2012

(87) PCT Pub. No.: WO2011/162042
PCT Pub. Date: Dec. 29, 2011

(65) Prior Publication Data
US 2012/0182842 A1    Jul. 19, 2012

(30) Foreign Application Priority Data

Jun. 25, 2010    (JP) ................................. 2010-144662

(51) Int. Cl.
*G11B 11/00*    (2006.01)

(52) U.S. Cl.
USPC .................................... 369/13.33; 369/13.13

(58) Field of Classification Search
USPC .......... 369/13.13, 13.33, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| 5,787,106 A | 7/1998 | Tabuchi et al. |
| 6,950,598 B1 | 9/2005 | Tawa et al. |

(Continued)

FOREIGN PATENT DOCUMENTS

| JP | 8-330673 | 12/1996 |
| JP | 2006-73105 | 3/2006 |

(Continued)

OTHER PUBLICATIONS

Tim Rausch et al., Near Field Heat Assisted Magnetic Recording with a Planar Solid Immersion Lens, Japanese Journal of Applied Physics, 2006, pp. 1314-1320, vol. 45, No. 2B.

(Continued)

*Primary Examiner* — Tan X Dinh
(74) *Attorney, Agent, or Firm* — Antonelli, Terry, Stout & Kraus, LLP.

(57) ABSTRACT

Provided is a thermal-assisted-magnetic-recording head capable of irradiating a magnetic recording medium with light with a spot size reduced on the submicron order with high utilization efficiency. A spot size converter 13 for guiding light emitted from an optical source 4 into a magnetic head is provided at a position adjacent to a magnetic main pole 19 in the magnetic head. In the spot size converter 13, a cover layer 15 having a lower refractive index than those of a core 14 and a clad material 24 is formed between the core 14 and the clad 15 and has a shape composed of a shape substantially rectangular in a light traveling direction and a taper shape having a width increasing toward the bottom surface of the magnetic head.

9 Claims, 21 Drawing Sheets

(56) References Cited

U.S. PATENT DOCUMENTS

| | | |
|---|---|---|
| 7,359,599 B2 | 4/2008 | Matsumoto |
| 8,098,547 B2 * | 1/2012 | Komura et al. ............ 369/13.33 |
| 2009/0052077 A1 * | 2/2009 | Tanaka et al. ............. 369/13.33 |
| 2009/0185459 A1 | 7/2009 | Matsumoto |
| 2011/0090770 A1 * | 4/2011 | Iwanabe et al. ............ 369/13.33 |
| 2011/0205660 A1 * | 8/2011 | Komura et al. ............ 369/13.33 |
| 2011/0216635 A1 | 9/2011 | Matsumoto |
| 2011/0235478 A1 * | 9/2011 | Komura et al. ............ 369/13.33 |
| 2011/0310713 A1 * | 12/2011 | Komura et al. ............ 369/13.24 |
| 2012/0147716 A1 * | 6/2012 | Hara et al. ................ 369/13.33 |
| 2012/0147717 A1 * | 6/2012 | Shimazawa et al. ....... 369/13.33 |
| 2012/0327751 A1 * | 12/2012 | Iwanabe et al. ............ 369/13.33 |

FOREIGN PATENT DOCUMENTS

| | | |
|---|---|---|
| JP | 2007-257753 | 10/2007 |
| JP | 2009-170053 | 7/2009 |
| JP | 2009-176354 | 8/2009 |
| WO | WO 2010/016262 A1 | 2/2010 |

OTHER PUBLICATIONS

Vilson R. Almeida et al., Naotaper for compact mode conversion, Optics Letters, Aug. 1, 2003, pp. 1302-1304, vol. 28, No. 15.

* cited by examiner

THERMAL-ASSISTED-MAGNETIC-RECORDING HEAD HAVING CORE COVER LAYER

TECHNICAL FIELD

The present invention relates to a thermal-assisted-magnetic-recording head and a magnetic recording system equipped with the thermal-assisted-magnetic-recording head.

BACKGROUND ART

The information recording density of magnetic recording systems has been increasing steadily, and the size of a magnetic recording mark per bit has been becoming smaller and smaller. So far, the recording bit size in the magnetic recording system has been mainly reduced by reducing the size of a magnetic recording head and magnetic particles used for a magnetic recording medium. However, since the magnetic recording density exceeded 1 Tbit/inch$^2$, there has been a concern that the magnetic information recorded on the magnetic recording medium may be lost at room temperature due to an influence of thermal fluctuation. To prevent this, a coercive force of the magnetic recording medium needs to be increased. Unfortunately, the magnitude of the magnetic field that can be generated by the magnetic recording head is limited. If the coercive force is excessively increased, the recording bit cannot be formed in the medium. In order to solve this, a thermally assisted magnetic recording method has received attention these days in which at an instant of recording, the medium is heated to reduce the coercive force of the medium, thereby enabling recording on a highly coercive medium. As the thermally assisted magnetic recording method, a method for achieving a high recording density has been heretofore proposed in which a fine light spot with high power density is outputted to a medium to locally heat only a recording region.

Usually, a lens is used to produce the fine light spot. Recently, the distance between the magnetic head and the magnetic recording medium is not more than 10 nm. If a magnetic head is increased in weight due to an optical element such as the lens mounted on the magnetic head, the weight causes problems such as bringing a magnetic recording head into contact with the magnetic recording medium, or hindering air-bearing of the head. Moreover, a plurality of magnetic recording media (disks) are stacked in the magnetic recording apparatus, and an interval between the magnetic recording media is usually not more than 1 mm. For this reason, all the parts provided around the magnetic head have to be accommodated within the height of not more than 1 mm. Accordingly, it is not preferable that the optical element such as the lens be mounted on the magnetic head.

In this regard, in one of method proposed as a method for producing a fine light spot on a magnetic recording medium without using a lens or the like, an optical waveguide including a core and a clad is formed. This method can be implemented by forming a core, by using a material with a large refractive index difference delta-n from the clad, the core having a width and a thickness in the submicron order.

PRIOR ART DOCUMENTS

Patent Documents

Patent Document 1: JP 2007-257753 A
Patent Document 2: JP 08-330673 A

Non-Patent Documents

Non-Patent Document 1: Japanese Journal of Applied Physics, Vol. 45, No. 2B, 2006, p.p. 1314-1320
Non-Patent Document 2: Optics Letters, Vol. 28, No. 15, 2003, p.p. 1302-1304

SUMMARY OF THE INVENTION

Problems to Be Solved by the Invention

In the magnetic recording system using the thermally assisted magnetic recording method, the spot size of the light emitted from an optical source and entering the optical waveguide is large in the order of several to several dozen micrometers. For this reason, in the case where the light directly enters the core having the width and the thickness in the submicron order, total optical propagation efficiency is low due to a large coupling loss of the light undesirably. This requires increase in the output light power of the optical source for implementing the thermally assisted magnetic recording, and results in increase in the power consumption in the whole magnetic recording system and increase in the temperature within the apparatus. Particularly, increase in the temperature leads to reduction in performance of the magnetic recording system.

Accordingly, an optical waveguide that can be efficiently coupled to the light having a large spot size to convert the light into a smaller light spot without loss of the light needs to be formed within the magnetic head. As the optical waveguide that can convert the spot size of the light (hereinafter, referred to as a spot size converter), Non-Patent Document 2 uses an optical waveguide (hereinafter, referred to as a taper-shaped core) including a core having a size of several dozen nm, made of a high-refractive-index material and formed in a taper shape that becomes thicker in the propagation direction of the light. This optical waveguide is coupled to the light having a relatively large spot size, and reduces the spot size in the submicron order while propagating the light within the optical waveguide. FIG. 2 is a drawing schematically showing a typical example of a taper-shaped core and change in a light intensity profile 26 of the light that propagates in the taper-shaped core. As shown in FIG. 2, the spot size of the light is reduced as the light propagates along a taper-shaped optical waveguide core 14 from an upper portion having a smaller core width toward a lower portion having a larger core width.

FIG. 3 is a conceptual diagram for illustrating the principle of reducing the spot size by means of a taper-shaped core. In FIG. 3, the horizontal axis indicates a cross section area of the core, and the vertical axis indicates the spot size of light which can propagate in the core. In Non-Patent Document 2, the spot size is converted using a region in which the light propagates while the light greatly seeps from the core (a region enclosed with dashed line in FIG. 3, Hereinafter, referred to as a seeping mode). For example, the taper-shaped core has a tip end (where the cross section area of the core is small) at P1 in FIG. 3, and is formed in a taper shape in which the thickness is increased to have a large cross section area at P2 in FIG. 3. With this structure, the spot size of light is reduced when the light reaches P2 in FIG. 3. In Patent Document 1, an optical waveguide in combination of the taper-shaped core and a rectangular optical waveguide is formed within a magnetic head. However, in any of the spot size converters above, the size of the tip end of the taper-shaped core has to be several dozen rim or smaller in order to efficiently couple to the light having a light spot size of several to several dozen micrometers. Considering accuracy and variations in processing, products using such a small core tip end are difficult to manufacture.

Apparently from FIG. 3, if the difference delta-n in a refractive index between the core and the clad is reduced, the size of the tip end can be increased, but the spot size of the light that can be finally reduced is undesirably large. Accordingly, the taper-shaped core having a small value of delta-n is not suitable for a magnetic recording system employing a thermally assisted magnetic recording for emitting a fine light spot on a magnetic recording medium. In Patent Document 2, a material having a refractive index lower than that of the clad and called a transmission constant reduction enhancing layer is interposed between the core and the clad. Thereby, a spot size converter is configured without reducing delta-n. The spot size converter in Patent Document 2 aims at enlarging the spot size without consideration of any coupling of a portion configured to enlarge a spot size to light having a large spot size of several to several dozen micrometers (the light having a spherical wavefront).

Non-Patent Document 1 uses an optical waveguide called a planer solid immersion mirror in which the width of the core is reduced in an arc shape in the propagation direction of the light. Since grating is used for coupling of the incident light to optical waveguide, there is a concern about an optical propagation loss of the incident light due to deviation of the light axis of the incident light.

An object of the present invention is to provide a mechanism capable of irradiating a magnetic recording medium with light having a spot size reduced to the submicron order with high light utilizing efficiency by a spot size converter formed within a magnetic recording head in a magnetic recording apparatus in which a small and light-weight optical element is mounted on a magnetic head.

Means for Solving the Problems

To achieve the above object, in the present invention, an optical source is installed above an upper surface of a magnetic head, and a spot size converter having a cover layer made of a material having a refractive index lower than those of core and a clad material is formed between the core and the clad material in the magnetic head. Here, the upper surface of the magnetic head refers to a surface opposite to a surface forming an ABS (Air Bearing Surface) of the magnetic head.

The spot size converter has a shape substantially composed of a rectangular shape (hereinafter, referred to as a rectangular portion) and a taper shape following the rectangular portion and having a width increasing toward the bottom surface of the magnetic head (hereinafter, referred to as a taper portion).

In the spot size converter, either or both of a core tip end width and thickness of the tip end are set to be not larger than those that induce the seeping mode described above, and a layer (hereinafter, referred to as a cover layer) in contact with the core is formed between the core and the clad material. The cover layer is characterized by having a refractive index lower than those of the core and the clad material. By adjusting the tip end of the spot size converter in such a manner, a refractive index difference delta-n between the core and the clad can be effectively reduced, thereby the spot size of light which can be coupled with and propagates in the tip end can be enlarged, and as a result, incident light having a large spot size emitted from the optical source can be efficiently coupled to the spot size converter.

Here, to efficiently convert the spot size of the light, the wavefront of the light to be subjected to size-conversion needs to be as flat as possible. In the spot size converter, the light is propagated in the rectangular portion in which the cover layer made of a material having a refractive index lower than that of the optical waveguide core and that of the clad material is formed between the optical waveguide core made of a high-refractive-index material and the clad material. Thereby, the wavefront can be made flat.

The taper portion of the spot size converter serves to reduce the spot size of the light. Since the spot size is reduced while light propagates in the taper portion, light having a spot size on the nanometer order can be emitted from the bottom surface of the magnetic head. Further, since light coupling to the taper portion has a wavefront flattened in the rectangular portion, the spot size of the light can be reduced at high total optical propagation efficiency in the taper portion.

To further enhance the total optical propagation efficiency of the spot size converter, an additional rectangular portion (a bar-shaped core) may be formed at two sides of either or both of the rectangular portion and the taper portion. By forming the additional rectangular portions in this manner, light coupling and propagating in the bar-shaped core on the two sides can be coupled to the taper portion.

In the spot size converter, a rectangular portion is formed for flattening the wavefront of the light coupling to the taper portion, but an equivalent effect can be obtained by forming a waveguide (hereinafter, referred to as a thin core) just including a core and a clad instead of the rectangular portion. In the waveguide just including the core and the clad and having an effect of flattening the wavefront of the light, a width or thickness of the core may be equal to or larger than a width or a thickness (Ww) to an extent that induces the seeping mode.

Further, to further enhance the total optical propagation efficiency of the spot size converter, either or both of the rectangular portion and the taper portion may be formed between two thin cores. By forming in such a manner, light coupling to each of the thin cores can be coupled to the taper portion and thereby the total optical propagation efficiency can be improved.

The thin core may be a thin core in which a cover layer made of a material having a refractive index lower than those of the core and the clad material is formed between the core and the clad material.

Effect of the Invention

According to an aspect of the present invention, a recording region of a magnetic recording medium can be locally heated by emitting, at high total optical propagation efficiency, light of a fine spot size which is converted from incident light having a large spot size.

MODES FOR CARRYING OUT THE INVENTION

Hereinafter, embodiments of the present invention are described with reference to the accompanying drawings.

Embodiment 1

Figure 1:
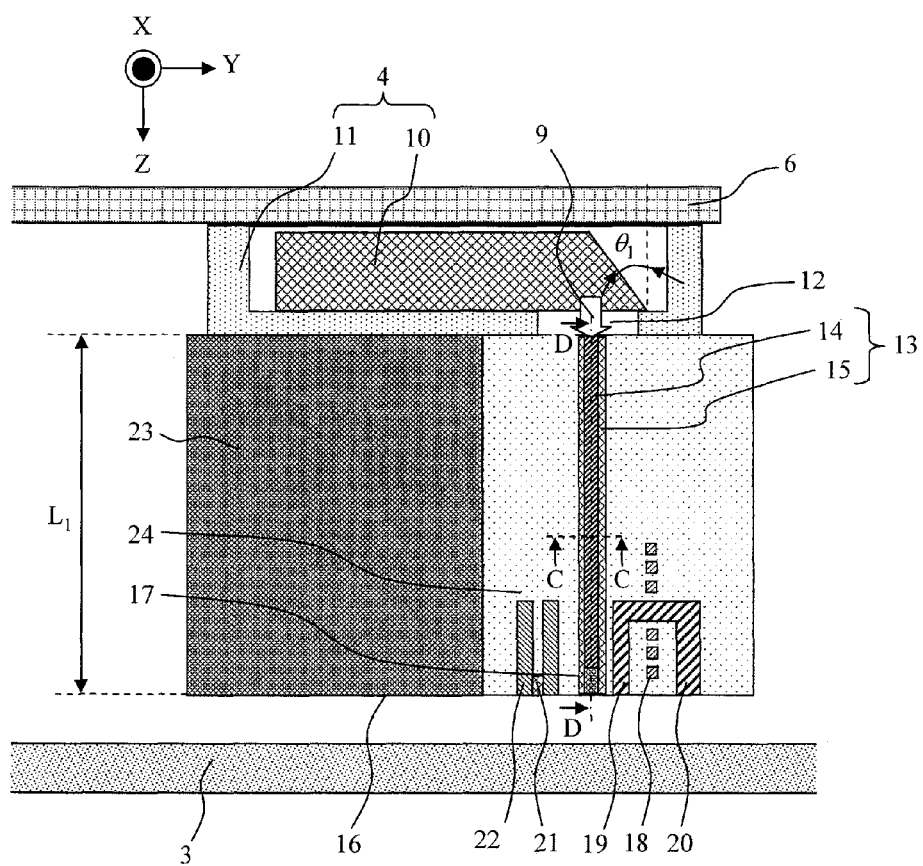
FIG. 1 is a schematic cross sectional view of a magnetic head comprising a spot size converter according to the present invention.
Figure 2:
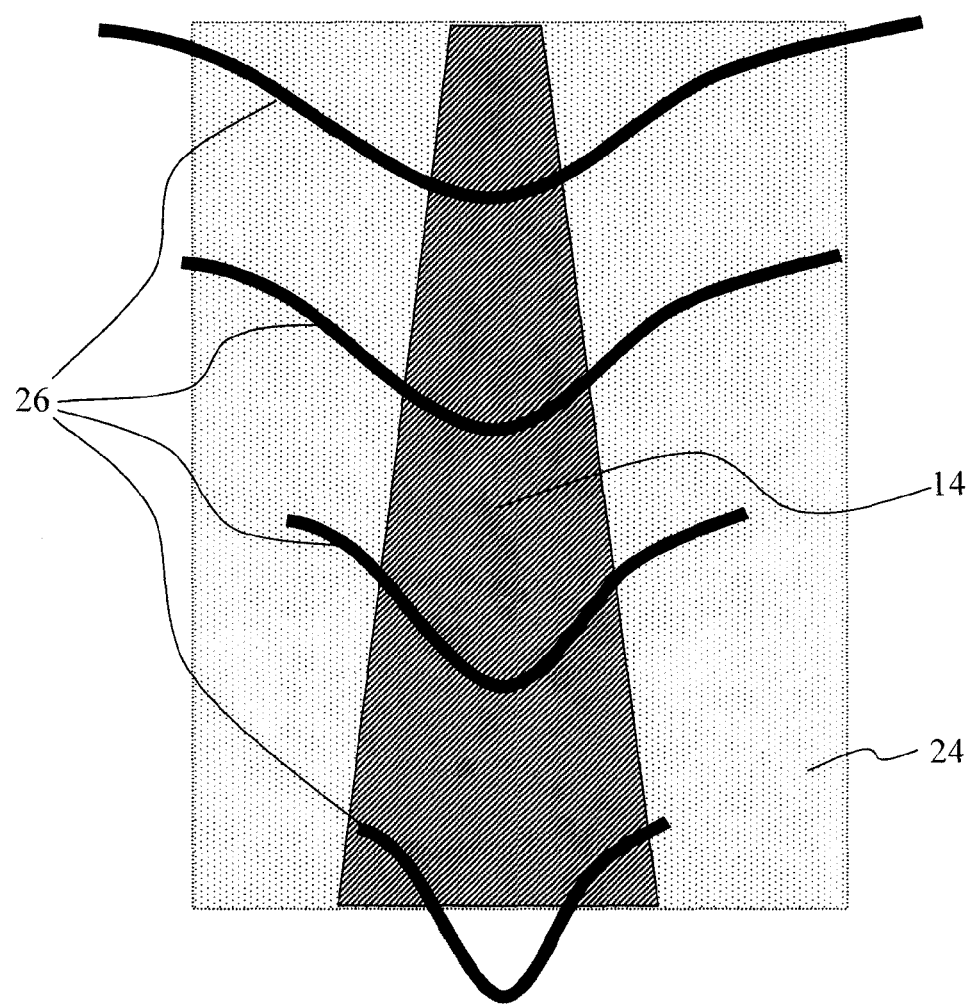
FIG. 2 is a schematic view illustrating a variation of an intensity profile of light propagating in a waveguide comprising a taper-shaped core and a clad material.
Figure 4:
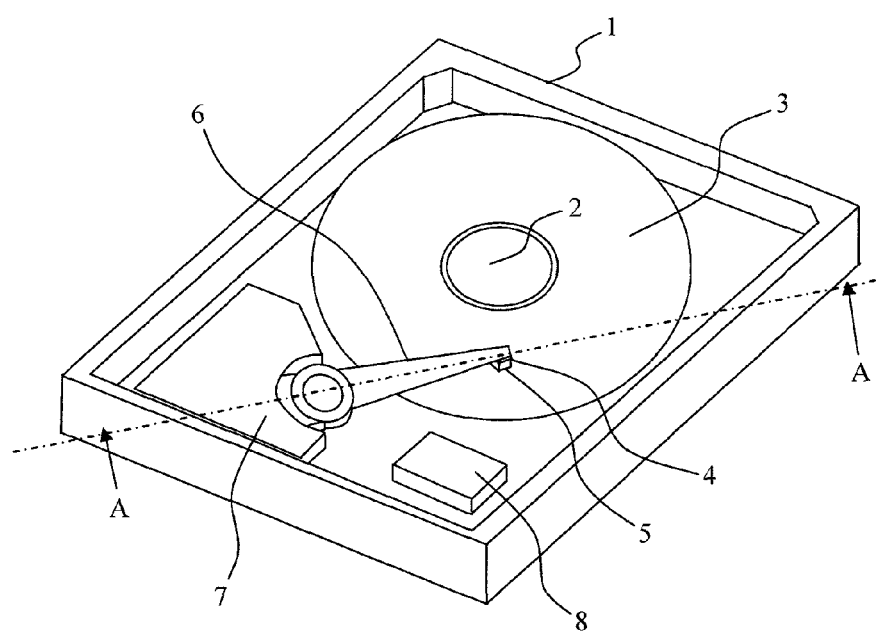
FIG. 4 is a perspective view showing an example of a magnetic recording system according to the present invention.
Figure 5:
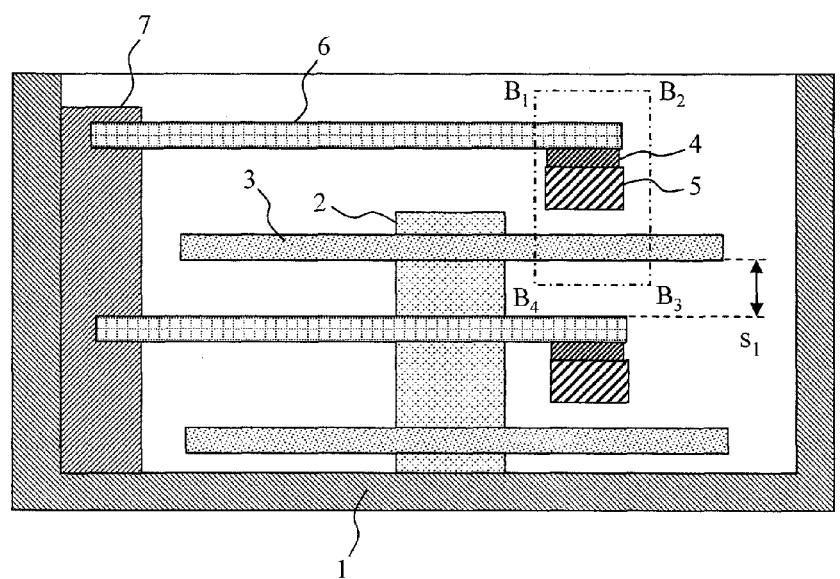
FIG. 5 is a cross sectional view taken along a line A-A of FIG. 4.

A magnetic recording system including a highly efficient optical integrated mechanism according to the present invention is described with reference to FIG. 4, FIG. 5 and FIG. 1. FIG. 4 is a perspective view showing an example of a magnetic recording system according to the present invention, with an upper cover removed from a housing 1. FIG. 5 is a cross-sectional view taken along a line A-A of FIG. 4. FIG. 1 is a cross-sectional view of a circumference of a magnetic head comprising a spot size converter, which corresponds to FIG. 5 showing enlarged regions $B_1$-$B_2$-$B_3$-$B_4$.

As shown in FIG. 4, a magnetic head 5 is fixed to a suspension 6 in such a manner that the position thereof is moved by a voice coil motor 7. A magnetic recording medium 3 rotates by being fixed to a spindle 2 which is driven by a motor in a rotatable mariner. As shown in FIG. 1, ABS (Air Bearing Surface) is formed at a magnetic head bottom surface 16 to generate a negative pressure between the magnetic recording medium 3 and the magnetic head bottom 16 when the magnetic recording medium 3 rotates, so as to float the magnetic head by a floating height of 10 nm or less above the magnetic recording medium 3.

As shown in FIG. 5, the housing 1 includes at least one magnetic recording medium 3 fixed to the spindle 2 and at least one suspension 6 fixed to the voice coil motor 7. A distance $S_1$ between the suspension 6 and an upper-stage magnetic recording medium 3 is 1 mm or smaller. An optical source 4 emitting light necessary for heat assisted magnetic recording and the magnetic head 5 are mounted on each of suspensions 6. The optical source 4 is provided between the suspension 6 and the magnetic head 5. By forming the optical source 4 in such a manner, heat generated in the optical source 4 can be discharged to the magnetic recording medium 3 via the magnetic head 5, so that the optical source can be driven in a stable manner.

Further, as shown in the cross-sectional view of the circumference of the magnetic head of FIG. 1, a spot size converter 13 capable of propagating light while reducing the spot size thereof is formed inside the magnetic head. Length $L_1$ of the magnetic head in a Z direction is 230 micrometers. As the optical source 4, a laser diode 10 mounted in a sub-mount 11 and generating light having a wavelength of 760±20 nm or 830±20 nm is used. One end surface of the laser diode 10 is machined to have a $theta_1$ of 40 to 45 degrees in order to reflect light toward the magnetic head bottom surface. And, a light transmission hole 12 is provided on the sub-mount 11 to allow light to enter the spot size converter 13.

The light transmission hole 12 is preferably filled with a material which has a low light absorption property and a refractive index higher than air (refractive index >1). With such a configuration, spread of the spot size of light emitted from the laser diode 10 can be suppressed. As a material for filling the light transmission hole 12, a UV cured resin, a thermosetting adhesive or the like generally used for adhering optical parts is preferable, since such a material suppresses spread of the spot size but also serves to work as an adhesive to adhere the sub-mount 11 and the magnetic head to each other.

Light emitted from the optical source (incident light 9) propagates in the spot size converter 13, is guided to the magnetic head bottom surface 16 while the spot size thereof is being reduced, and is irradiated onto the magnetic recording medium 3. At a terminating portion of the spot size converter 13, an optical near-field transducer 17 capable of generating a fine light spot may be formed. As the optical near-field transducer 17, it is preferable to use a metal scatter of a triangular shape as viewed from the magnetic head bottom surface 16 (Optics Letters, Vol. 31, No. 15, Jan. 15, 2006, Page 259). Further, a light-shielding film may be formed in a vicinity of the optical near-field transducer 17 to prevent a background light existing in the vicinity of the optical near-filed transducer from being irradiated to the magnetic recording medium 3. Further, the optical near-field transducer 17 may have a V-shaped opening with a portion of the metal scatter connected to a shielding film (Japanese Unexamined Patent Application Publication No. 2001-255254) or have a C-shaped opening (Optics Letters, Vol. 28, No. 15, 2003, page 1320).

A magnetic field needed for recording is generated by using a thin film coil 18 formed in the magnetic head, and magnetic field thus generated is guided to a terminating end of the spot size converter by a magnetic main pole 19. The magnetic main pole 19 is mounted at a position apart by 200 nm or less from the spot size converter 13. Opposite to the thin film coil 18, a magnetic return pole 20 for forming a closed magnetic field is formed. Next to the magnetic return pole 20, a magnetic reproducing element 21 for reproducing the recording mark is formed. The magnetic reproducing element may be a GMR (Giant Magneto Resistive) element or a TMR (Tunneling Magneto Resistive) element. In the circumference of the magnetic reproducing element 21, a shield 22 for shielding circumferential magnetic field is formed.

Figure 3:
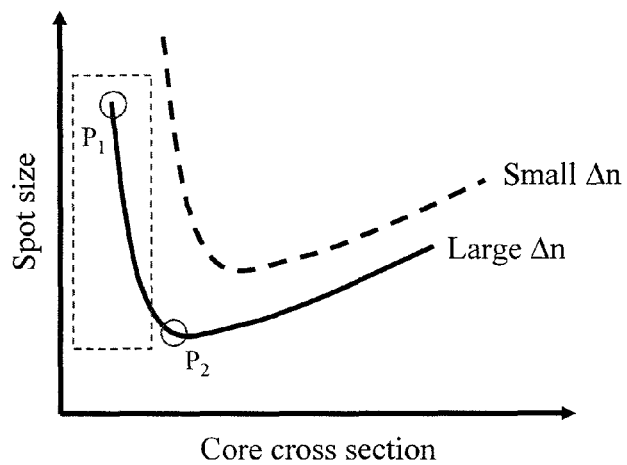
FIG. 3 is a schematic view showing a relationship between a cross section area of a core and the spot size of light coupling to and propagating in a waveguide.

Next, a record reproducing method using the magnetic recording system is described. With the magnetic recording medium 3 being rotated, at the moment of recording, magnetic field is generated by a thin film coil 18 provided in the magnetic head 5, simultaneously the laser diode 10 is caused to emit light, and thereby a magnetic recording mark is formed in the magnetic recording medium 3. This is because heat assisted magnetic recording is achieved at the moment when the laser diode 10 emits light, which causes the light to propagate in the spot size converter 13 and irradiate and thereby heat the magnetic recording medium 3. Since the heat assisted magnetic recording is essentially determined by the temperature of the magnetic recording medium, a timing of generating the magnetic field is not necessarily same as a timing of causing the optical source to emit light. For example, magnetic field may be generated after heating the magnetic recording medium 3 by light emitted from the optical source 4. Further, magnetic information may also be recorded in the magnetic recording medium by continuously emitting light to the magnetic recording medium and emitting a magnetic field with desired recording information modulated to a magnetic field pulse. Further, magnetic information may be recorded in the magnetic recording medium by continuously generating magnetic field and emitting light pulse-modulated with desired recording information. To reproduce the magnetic recording mark, a magnetic reproducing element 21 formed in the magnetic head shown in FIG. 1 is used. The reproduction signal is processed by signal processing LSI 8 shown in FIG. 3.

Next, the spot size converter formed inside the magnetic head is described in detail. As shown in FIG. 1, the spot size converter 13 is covered with a clad material 24. The spot size converter 13 serves to directly couple with light (incident light 9) emitted from the optical source 4 and propagate the light up to the magnetic head bottom surface 16 and irradiate light of a fine sport size onto the magnetic recording medium. Therefore, the spot size converter 13 extends from an upper surface of the magnetic head toward the magnetic head bottom surface 16.

Figure 6A:
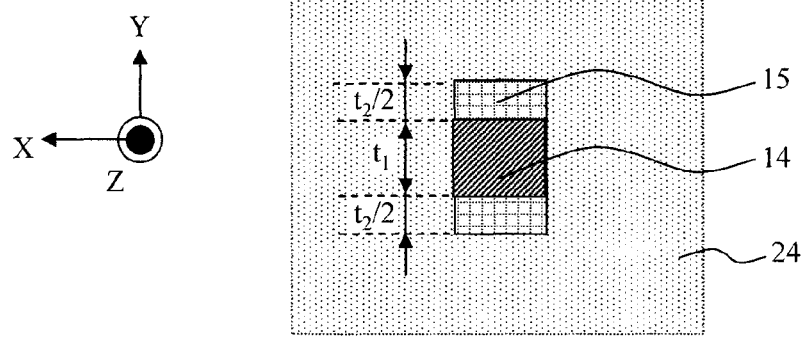
FIG. 6A is a cross sectional view of a spot size converter including a core, a clad material and a cover layer formed between the core and the clad material, taken along a line A-A shown in FIG. 1.
Figure 6B:
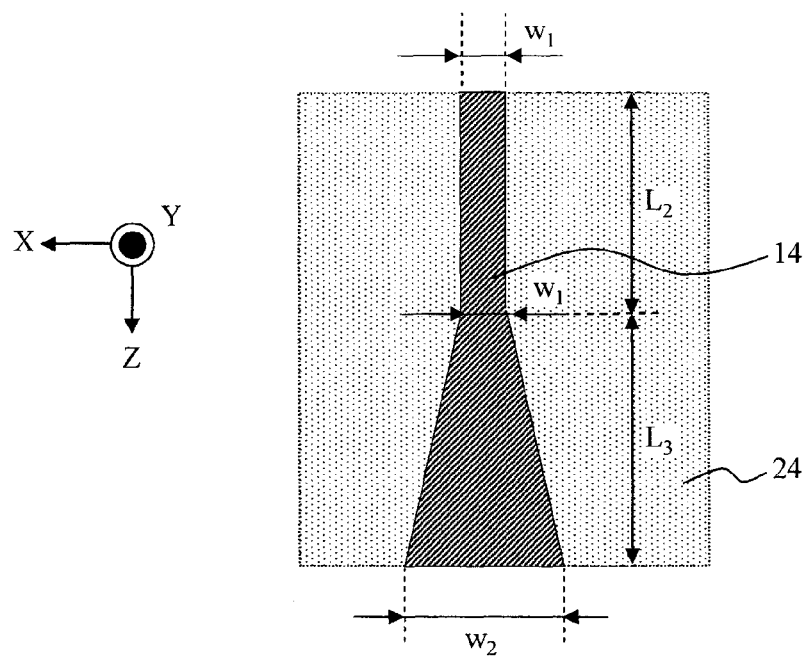
FIG. 6B is a cross sectional view of a spot size converter including a core, a clad material and a cover layer formed between the core and the clad material, taken along a line D-D shown in FIG. 1.

FIG. 6A is a cross-sectional view along a line C-C of FIG. 1, and FIG. 6B is a cross-sectional view along a line D-D of FIG. 1. As shown in FIG. 6A, the spot size converter 13 has layers 15 which are formed between top and bottom of the core 14 in a Y direction and the clad material 24 in such a manner so as to contact the core. Hereinafter, such a layer contacting the core is referred to as a cover layer 15. The cover layer 15 is characterized by having a lower refractive index than those of the core 14 and the clad material 24. Thickness of cover layers 15 formed at top and bottom of the core 14 in the Y direction is $t_2/2$ respectively, with a total thickness of $t_2$. A refractive index of the core 14 is higher than that of the clad material 24. As shown in FIG. 6B, a shape of the spot size converter viewed in the XZ plane is a shape composed of a substantially rectangular shape and a taper shape (trapezoidal) following the rectangular shape and having a width enlarging toward a magnetic head bottom surface. The shape of the cover layer 15 viewed in the XZ plane is also a shape substantially equivalent to a shape of the core 14. A length $L_2+L_3$ of the spot size converter in a Z direction is 230 micrometers, a length ($L_1$) of the magnetic head. The rectangular portion of the spot size converter 13 serves to couple with incident light 9 and flatten wavefront of the propagating light, and the taper portion serves to reduce the spot size of the light.

In this embodiment, the clad material 24, the core 14 and the cover layer 15 are respectively made of $Al_2O_3$ having a refractive index of 1.57 to 1.66, $Ta_2O_5$ having a refractive index of 2.13, and $SiO_2$ having a refractive index of 1.45. Even when a different clad or core material is used, there is no substantial variation in properties of the optical waveguide (spot size converter is a kind of the optical waveguide) if a refractive index difference delta-n between the core and the clad material is same. Therefore, for example, $Si_3N_4$ (refractive index: 1.89 to 2.10) may be used for the core 14, and $SiO_2$—$Si_3N_4$ may be used for the clad material 24. The refractive index of $SiO_2$—$Si_3N_4$, a material of the clad material 24, may be adjusted within a range between 1.45 and 2.10 by simultaneously spattering $SiO_2$ and $Si_3N_4$ by a spattering method while controlling a film forming rate of $SiO_2$ and $Si_3N_4$.

In this embodiment, a core terminating end width $w_2$ of the spot size converter 13 is 0.5 or 0.6 micrometers, and a core terminating end thickness $t_1$ is 0.2 or 0.3 micrometers. As described above, the spot size converter 13 serves to irradiate light of a fine sport size to the magnetic recording medium. By adjusting the core terminating width $w_2$ and the core terminating thickness $t_1$ as above, light having a spot size of about 500 nm can be emitted from a terminating end of the spot size converter 13 toward the magnetic recording medium 3. When forming the optical near-field transducer 17 at the terminating end of the spot size converter 13, a width and a thickness of a high refractive index core at the magnetic head bottom surface need to be same as the size of the optical near-field transducer (both width and thickness: 0.6 micrometers or smaller). Therefore, both the width $w_2$ and the thickness $t_1$ are preferably 0.6 micrometers or smaller.

Figure 7A:
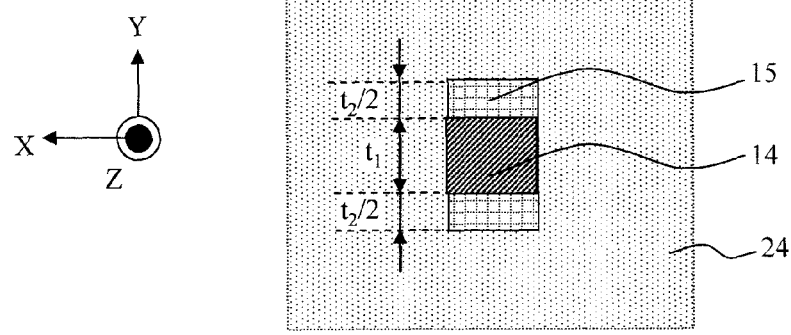
FIG. 7A is a view showing an example of a structure of a spot size converter with a lower portion of a core terminating end of a taper portion further extended, and is a cross sectional view in a direction perpendicular to a light propagation direction of the spot size converter.
Figure 7B:
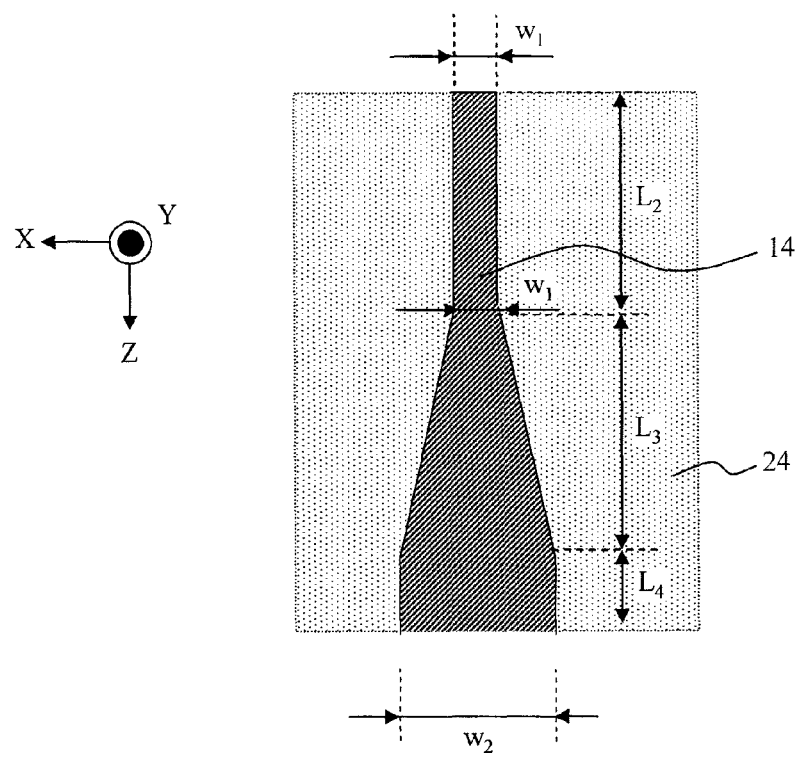
FIG. 7B is a view showing an example of a structure of a spot size converter with a lower portion of a core terminating end of a taper portion further extended, and is a cross sectional view taken along a light propagation direction.

As shown in FIG. 7B, the core of the spot size converter may be shaped in such a manner that a lower portion of the core terminating end of the taper portion is further extended. FIG. 7A is a cross-sectional view of the spot size converter in a direction perpendicular to a light propagation direction, and FIG. 7B is a cross-sectional view in a direction along the light propagation direction. In this case, a length $L_2+L_3+L_4$ of the spot size converter in a Z direction is a length ($L_1$) of the magnetic head. In a vicinity of the core terminating end of the magnetic head, there exist a magnetic main pole 19, a magnetic return pole 20 and a thin film coil 18. Thus, there is a concern that if there exists light propagating thereinto by seeping the core in this vicinity, light transmission efficiency decreases due to the light absorbed into the magnetic main pole 19, the magnetic return pole 20 and the thin film coil 18. Thus, with a configuration shown in FIG. 7A and FIG. 7B, light propagating in a vicinity of the magnetic main pole 19, the magnetic return pole 20 and the thin film coil 18 is confined in the core at a maximum, and thereby a drop of the light transmission efficiency can be suppressed.

In this embodiment, either or both of the core tip end $w_1$ and the thickness $t_1$ at the tip end of the spot size converter 13 is reduced to be not larger than a width or a thickness that induces the seeping mode described above, and the core is sandwiched between cover layers 15. By adjusting the tip end of the spot size converter 13 in such a manner, a refractive index difference delta-n between the core and the clad can be effectively reduced, whereby the spot size of light which can be coupled to and propagated in the tip end can be enlarged, and as a result, incident light 9 having a large spot size shown in FIG. 1 can be efficiently coupled to the spot size converter 13.

A width or a thickness (Ww) to an extent that induces the seeping mode can be expressed approximately with a formula shown below by modifying a standing wave conditional equation for a zero order mode in the optical waveguide.

[Math 1]

$$Ww = \frac{\pi}{2\pi \cdot n_1 \cdot \sin\theta_1 / \lambda} \quad (1)$$

Here, $\theta_1$ is represents a critical angle of the light at an interface between the core and the clad and can be expressed with a formula shown below.

$$\theta_1 = \sin^{-1}\left(\frac{\sqrt{n_1^2 - n_2^2}}{n_1}\right) \quad (2)$$

Figure 8:
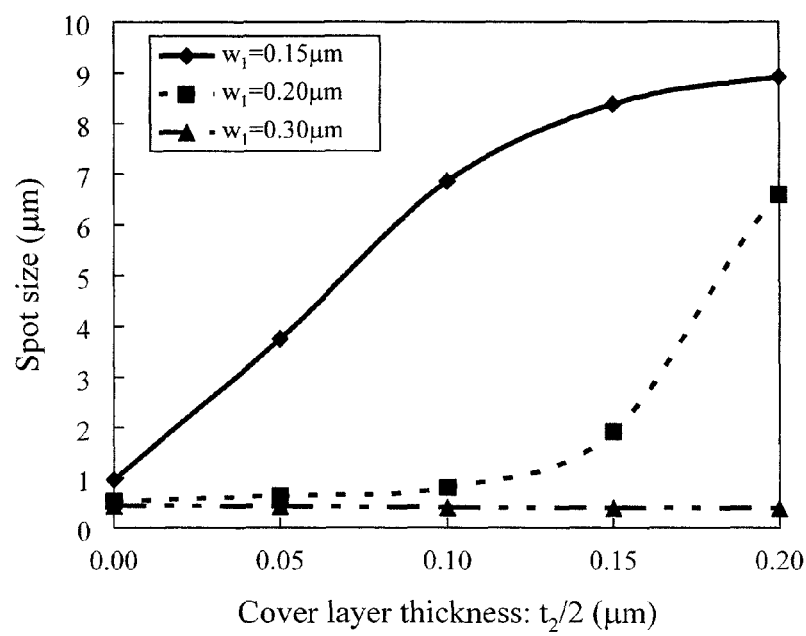
FIG. 8 is a diagram showing a relationship between the cover layer thickness and the core width and the spot size of light which can couple to and propagate in the spot size converter.

Where;
$\lambda$: wavelength of light in vacuum
$n_1$: refractive index of core material
$n_2$: refractive index of clad material Here, a calculation result of the spot size of light which can be coupled to and propagated in the core tip end of the spot size converter 13 obtained by using the Beam Propagation Method (BPM) is shown in FIG. 8. The horizontal axis in FIG. 8 represents a thickness $t_2/2$ of the cover layer, and the vertical axis represents the spot size of light which can be coupled to and propagated in the core tip end. In this calculation, the width is calculated each for $w_1$=0.15, 0.20 and 0.30 micrometers by assuming that the width $w_1$ and the thickness $t_1$ of the core 14 are a same value, wavelength of the light is 760±20 nm, and the light is polarized to be circular polarized light. A width (Ww) to the extent that induces the seeping mode according to the present embodiment is about 290 nm.

From FIG. 8, it is apparent that having any of the widths other than $w_1$=0.30 micrometers, the core 14 provided with the cover layer can increase the spot size of light which can be coupled and propagated. The reason why the spot size does not increase when $w_1$=0.30 micrometers is that an effect to effectively reduce the refractive index difference delta-n between the core and the clad cannot be obtained since the width ($w_1$) and the thickness ($t_1$) are larger than a width or a thickness (Ww) to an extent that induces the seeping mode.

Accordingly, in this embodiment, either or both of the core width $w_1$ and the core thickness $t_1$ is defined as 290 nm When wavelength of the light is 830±20 nm, either or both of the core width $w_1$ and the core thickness $t_1$ is defined as 310 nm or less from the above formula for calculating Ww.

Further, the thickness $t_2$ of the cover layer 15 shown in FIG. 6A may be adjusted approximately to a value (Tc) expressed in a formula shown below.

[Math 2]

$$Tc = \frac{A \cdot t_1}{Ww} \quad (3)$$

Where;
A is defined by:

$$n_1 \cdot t_1 + n_3 \cdot A = n_2 \cdot (t_1 + A) \quad (4)$$

$n_1$: refractive index of core material
$n_2$: refractive index of clad material
$n_3$: refractive index of cover layer
$t_1$: thickness of core Ww: approximate width or thickness that induces the seeping mode expressed in Formula (1)

When $t_2$ becomes a thickness of Tc, a refractive index difference delta-n between the core and the clad can be zero effectively, whereby the spot size of light which can be coupled to and propagated in a tip end of the spot size converter 13 can be made maximum, and as a result, incident light 9 having a large spot size shown in FIG. 1 can be coupled to the spot size converter efficiently.

Figure 9:
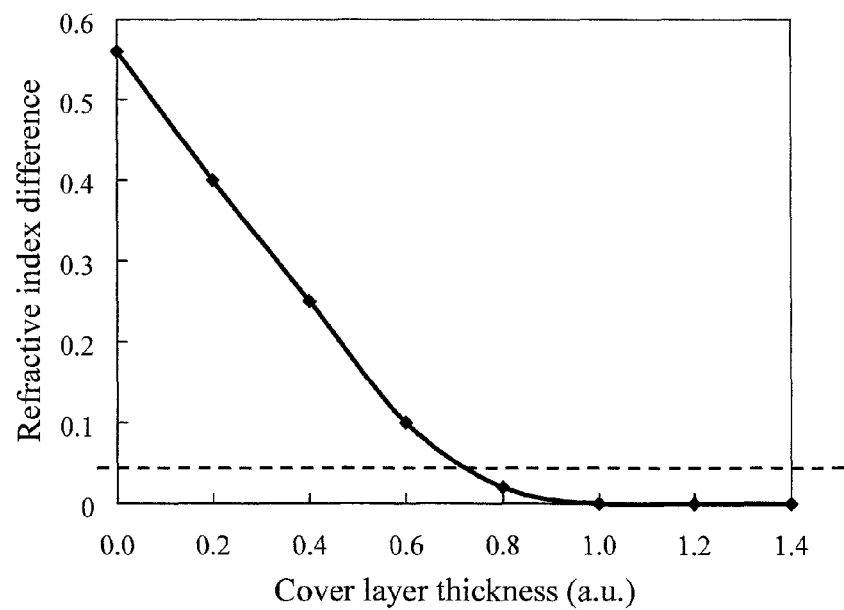
FIG. 9 is a diagram showing a relationship between the cover layer thickness and the refractive index difference between an effective core and a clad material.

FIG. 9 is a diagram showing a relationship of the effective refractive index difference between the core and the clad with respect to the thickness of the cover layer. The horizontal axis in FIG. 9 shows the thickness $t_2$ of the cover layer, and the vertical axis shows the efficient refractive index difference between the core and the clad. In FIG. 9, a thickness of the cover layer making the efficient refractive index difference zero is defined as 1.0, which represents a calculation result obtained when either or both of the core width $w_1$ and the core thickness $t_1$ is smaller than the above Ww. FIG. 9 shows that the efficient refractive index is 0.05 or lower when Tc is approximately 70% of a thickness of the cover layer making the refractive index difference zero.

Figure 10:
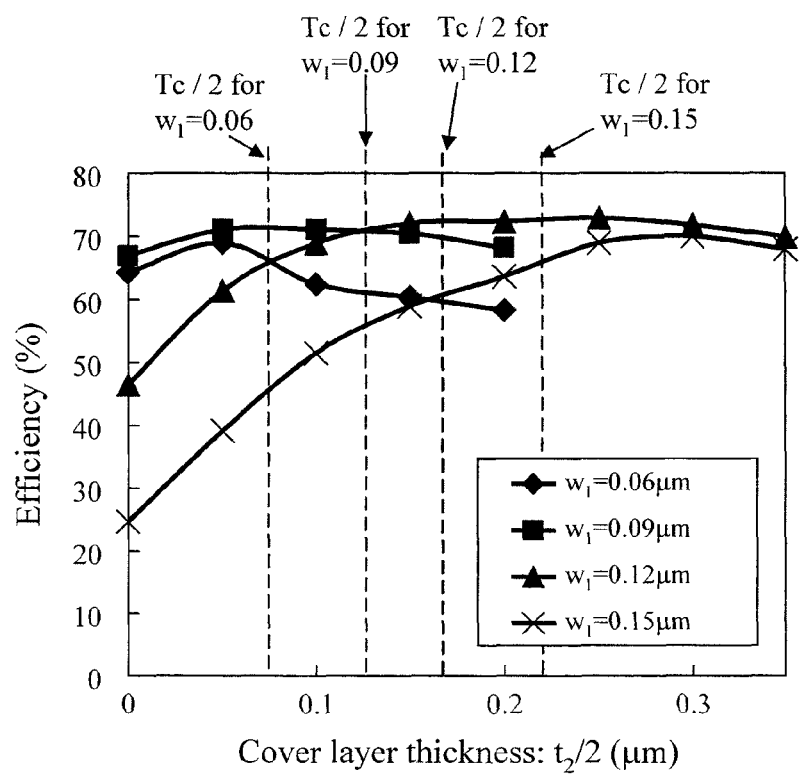
FIG. 10 is a diagram showing a relationship between the cover layer thickness and the core width and the total optical propagation efficiency of the spot size converter.

Further, a calculation result of the dependency of the total optical propagation efficiency of the spot size converter 13 on the thickness $t_2$ of the cover layer obtained by using the BPM method is shown in FIG. 10. The horizontal axis in FIG. 10 shows the thickness $t_2/2$ of the cover layer, and the vertical axis shows the total optical propagation efficiency (power of light emitted from spot size converter/power of incident light) of the spot size converter. This calculation is made for $w_1$=0.06 micrometers, 0.09 micrometers, 0.12 micrometers and 0.15 micrometers by assuming that light incident on the spot size converter has a wavelength of 760±20 nm, is polarized to be linear polarized light in the Y direction, and has a spot size of 5 micrometers, and that the core 14 of the spot size converter 13 shown in FIG. 6A and FIG. 6B has a thickness $t_1$ of 0.2 micrometers and a length $L_2$ of 0 micrometer (thus, $L_3$=230 micrometers). From FIG. 10, it is apparent that in all cases of the above core widths w1, the total optical propagation efficiency can be made maximum when the thickness $t_2$ of the cover layer is a thickness within a range of approximately ±30% of Tc expressed in the above formula. Therefore, it is preferable that the thickness $t_2$ of the cover layer is within a range of ±30% of Tc expressed in the above formula.

In the present embodiment, when the core thickness $t_1$ is 0.2 micrometers, the thickness $t_2/2$ of the cover layer is defined as 60 nm with respect to the core width $w_1$ of 0.06 micrometers (in this case, Tc/2=84 nm), the thickness $t_2/2$ of the cover layer is defined as 100 nm with respect to the core width $w_1$ of 0.09 micrometers (in this case, Tc/2=126 nm), the thickness $t_2/2$ of the cover layer is defined as 200 nm with respect to the core width $w_1$ of 0.12 micrometers (in this case, Tc/2=168 nm), or the thickness $t_2/2$ of the cover layer is defined as 250 nm with respect to the core width $w_1$ of 0.15 micrometers (in this case, Tc/2=210 nm). Further, when the core thickness $t_1$ is 0.3 micrometers, the thickness $t_2/2$ of the cover layer is defined as 100 nm with respect to the core width $w_1$ of 0.06 micrometers (in this case, Tc/2=126 nm), the thickness $t_2/2$ of the cover layer is defined as 160 nm with respect to the core width $w_1$ of 0.09 micrometers (in this case, Tc/2=189 nm), the thickness $t_2/2$ of the cover layer is defined as 280 nm with respect to the core width $w_1$ of 0.12 micrometers (in this case, Tc/2=252 nm), or the thickness $t_2/2$ of the cover layer is defined as 350 nm with respect to the core width $w_1$ of 0.15 micrometers (in this case, Tc/2=315 nm).

In this calculation, although the wavelength of the incident light is defined as 760±20 nm, when the wavelength is 830±20 nm, the thickness $t_2/2$ of the cover layer can be determined by newly obtaining Tc of 830±20 nm by assigning 830±20 nm to the wavelength lambda in the above formula for calculating Ww.

Figure 11A:
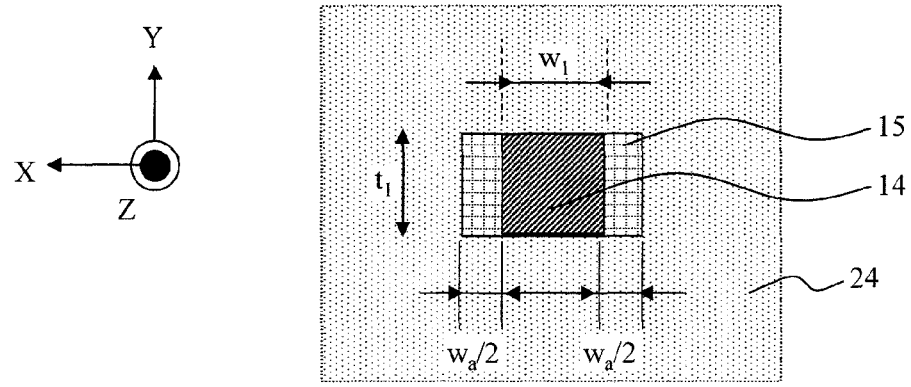
FIG. 11A is a view showing an example of cover layers provided on both sides of the core.
Figure 11B:
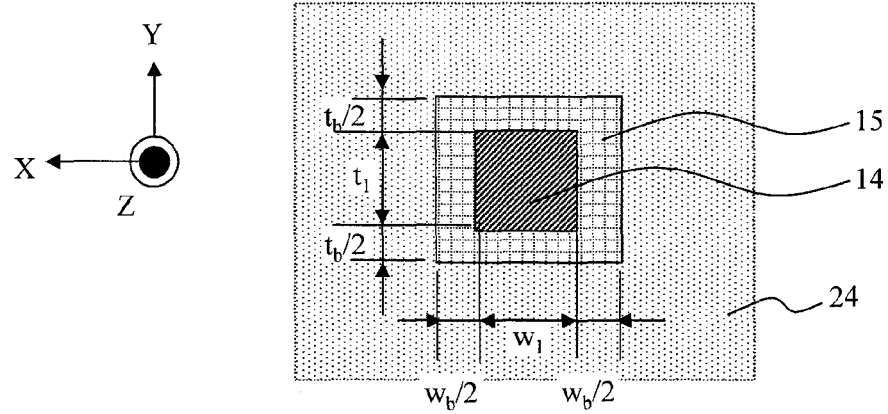
FIG. 11B is a view showing an example of a cover layer provided around the core.

Similar effects can be obtained in both cases where the above cover layers 15 are formed to sandwich two sides of the core 14 as shown in FIG. 11A and formed to sandwich the both of the lateral sides and the vertical sides of the core 14 as shown in FIG. 11B. For a thickness or a width of the cover layer shown in FIG. 11A and FIG. 11B, an optimum value can be obtained by making a cross-sectional area thereof equal to the cross-sectional area of the cover layer determined in a configuration shown in FIG. 6A and FIG. 6B. For example, in FIG. 6A and FIG. 6B, when an optimum thickness of the cover layer is $t_2$ with respect to a tip end width $w_1$ of the taper portion, a cross-sectional area of the cover layer becomes $w_1 \times t_2$. It is preferable to adjust the thickness and the width of the cover layer in such a manner that $w_1 \times t_2$ becomes equal to a cross-sectional area of the cover layer shown in FIG. 11A and FIG. 11B ($w_a \times t_1$ for FIG. 11A, and $(w_b+t_b+t_1 \times w_b)$ for FIG. 11B).

Figure 12A:
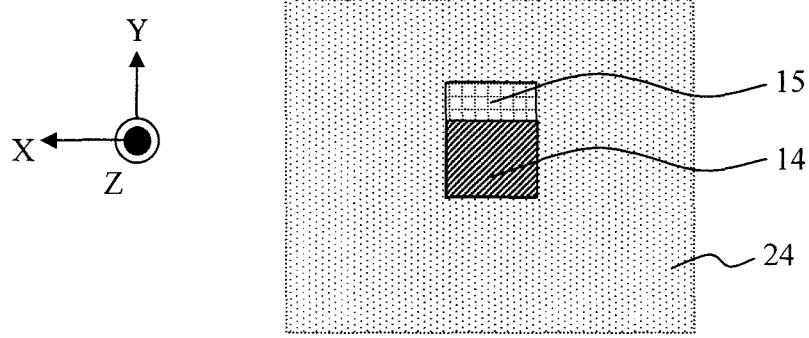
FIG. 12A is a view showing an example of a cover layer provided only on one side of the core in a Y direction.
Figure 12B:
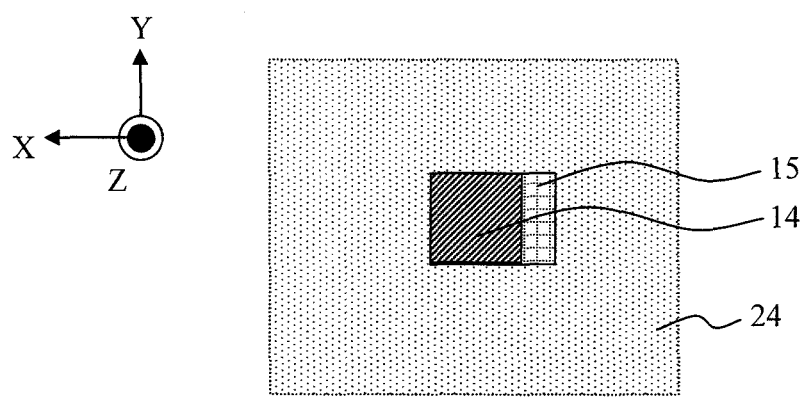
FIG. 12B is a view showing an example of a cover layer provided only on one side of the core in an X direction.

Further, a similar effect can be obtained even when the cover layer 15 is formed on one side of the core 14 as shown in FIG. 12A and FIG. 12B, but not by sandwiching two sides of the core 14. For a thickness or a width of the cover layer of this case, an optimum value may also be determined by making a cross-sectional area thereof equal to the cross-sectional area of the cover layer determined in a configuration shown in FIG. 6A and FIG. 6B as described above.

Further, a thickness or a width of cover layers shown in FIG. 6A, FIG. 6B, FIG. 7A, FIG. 7B, FIG. 11A and FIG. 11B may be different between an upper layer and a lower layer and between a left layer and a right layer respectively.

Figure 13:
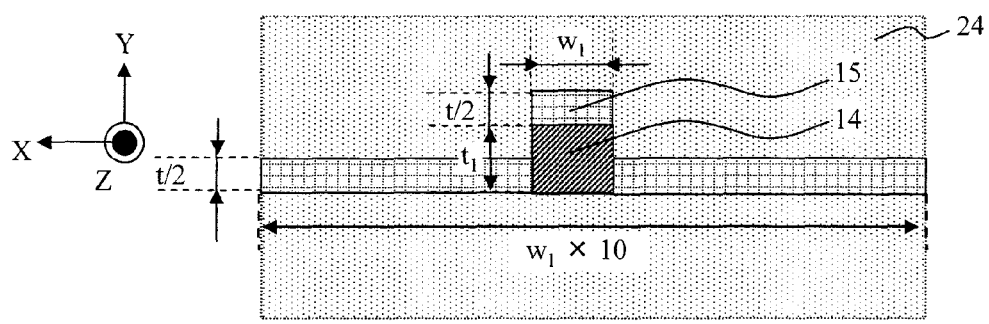
FIG. 13 is a view showing an example of a spot size converter in which a cover layer is provided on an upper surface and a portion of side surfaces of the core.
Figure 14:
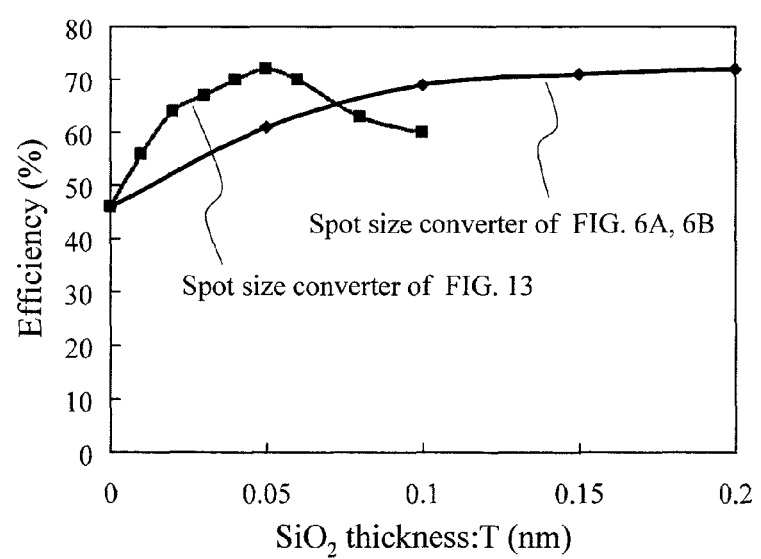
FIG. 14 is a diagram showing a relationship between the thickness of the cover layer in the spot size converter shown in FIG. 13 and the total optical propagation efficiency.

Further, as shown in FIG. 13, cover layers having a thickness same as a thickness of the upper core layer may be formed on an upper layer of the core 14 and on a portion of side surfaces of the core 14. A total length of cover layers on side surfaces of the core is 10 times the width w1 of the core 14. A calculation result of the dependency of the total optical propagation efficiency on the thickness $t_2$ of the cover layer by using the BPM method is shown in FIG. 14. The horizontal axis of FIG. 14 shows the thickness $t_2/2$ of the cover layer, and the vertical axis shows the total optical propagation efficiency of the spot size converter. This calculation is made for $w_1$=0.12 by assuming that light incident in the spot size converter has a wavelength of 760±20 nm, is polarized to be linear polarized light in the Y direction and has a spot size of 5 micrometers, and that the spot size converter shown in FIG. 14 has a thickness $t_1$ of 0.2 micrometers and a length $L_2$ of 0 micrometer (thus, $L_3$=230 micrometers). For a comparison purpose, the dependency of the total optical propagation efficiency of a spot size converter shown in FIG. 6A and FIG. 6B on the thickness $t_2$ of the cover layer is also calculated at a same time. From FIG. 14, it is apparent that in a configuration example shown in FIG. 13, an equivalent total optical propagation efficiency can be achieved with an approximately ¼ thickness $t_2$ of the cover layer when compared with a configuration example shown in FIG. 6A and FIG. 6B. Therefore, in a configuration example shown in FIG. 13, it is preferable that a thickness of the cover layer is approximately ¼ of an optimum thickness of the cover layer obtained for a configuration example shown in FIG. 6A and FIG. 6B.

Figure 15:
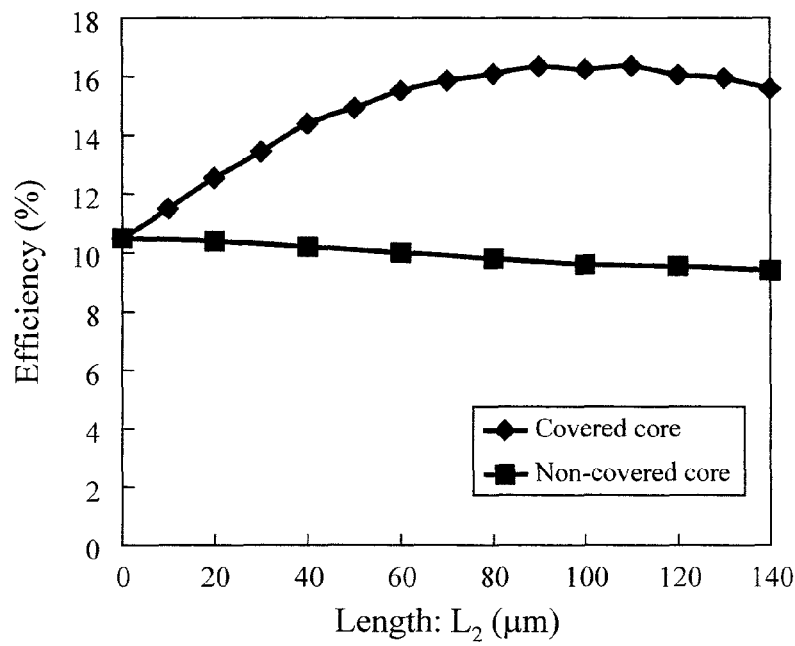
FIG. 15 is a diagram showing a relationship between the length of the rectangular portion and the total optical propagation efficiency of the spot size converter, for both cases where the cover layer is provided and where not provided.

In the above embodiment, a substantially rectangular shape (hereinafter, referred to as a rectangular portion) as viewed in the XZ plane is formed on top of the taper portion as shown in FIG. 6B. Light coupling to and propagating in such a rectangular portion has a wavefront thereof flattened before the light reaches the taper portion, whereby a loss caused when the spot size is reduced in the taper portion can be suppressed. Here, a calculation result of the dependency of the total optical propagation efficiency of the spot size converter 13 on the length L2 of the rectangular portion obtained by using the BPM method is shown in FIG. 15. The horizontal axis of FIG. 15 shows the length $L_2$ of the rectangular portion, and the vertical axis shows the total optical propagation efficiency of the spot size converter.

In this calculation, as light incident on the spot size converter, light having a spot size of approximately 3 micrometers is emitted into the spot size converter after the light freely propagated in a distance of 30 micrometers in air (in a medium having a refractive index of 1) in such a manner that the wavefront of the light becomes spherical at a tip end of the spot size converter (wavelength is 760±20 cm, and polarization is linear polarized light in the Y direction). Further, when the core thickness $t_1$ is 0.2 micrometers, the thickness $t_2/2$ of the cover layer is defined as 60 nm with respect to a core width $w_1$ of 0.06 micrometers (in this case, Tc/2=84 nm), a thickness $t_2/2$ of the cover layer is defined as 100 nm with respect to a core width $w_1$ of 0.09 micrometers (in this case, Tc/2=126 nm), the thickness $t_2/2$ of the cover layer is defined as 200 nm with respect to a core width $w_1$ of 0.12 micrometers (in this case, Tc/2=168 nm), or the thickness $t_2/2$ of the cover layer is defined as 250 nm with respect to a core width $w_1$ of 0.15 micrometers (in this case, Tc/22=210 nm). Further, when a core thickness $t_1$ is 0.3 micrometers, the thickness $t_2/2$ of the cover layer is defined as 100 nm with respect to a core width $w_1$ of 0.06 micrometers (in this case, Tc/2=126 nm), the thickness $t_2/2$ of the cover layer is defined as 160 nm with respect to a core width of 0.09 micrometers (in this case, Tc/2=189 nm), the thickness $t_2/2$ of the cover layer is defined as 280 nm with respect to a core width $w_1$ of 0.12 micrometers (in this case, Tc/2=252 nm), or the thickness $t_2/2$ of the cover layer is defined as 350 nm with respect to a core width of 0.15 micrometers (in this case, Tc/2=315 nm). For a comparison purpose, calculation of the dependency for a spot size converter having a core only but without a cover layer is also made. A core width w1 of the spot size converter having no cover layer is defined as 0.06 micrometers in such a manner that the total optical propagation efficiency when $L_2$=0 micrometer becomes equal to total optical propagation efficiency of a spot size converter having the cover layer when $L_2$=0 micrometer.

From FIG. 15, it is apparent that the total optical propagation efficiency becomes maximum when a length $L_2$ of the rectangular portion is approximately 90 micrometers, about 1.6 times when compared with a spot size converter having no rectangular portion. Drop of the total optical propagation efficiency when $L_2$ exceeds 90 micrometers is due to a loss of the spot size conversion as a result that a larger $L_2$ reduces a length $L_3$ of the taper portion which serves to reduce the spot size. Therefore, if there is no restriction to the length of the magnetic head, $L_2$ is preferably 90 micrometers or longer. Further, it is apparent that in a spot size converter having a core only but without a cover layer, the total optical propagation efficiency does not increase even by making a length $L_2$ of the rectangular portion longer, but, instead drops. From this, it is apparent that an effect of flattening the wavefront of the light in the rectangular portion does not work without the cover layer. In view of the above, $L_2$ of the rectangular portion according to this embodiment is defined as 90 micrometers.

Figure 16:
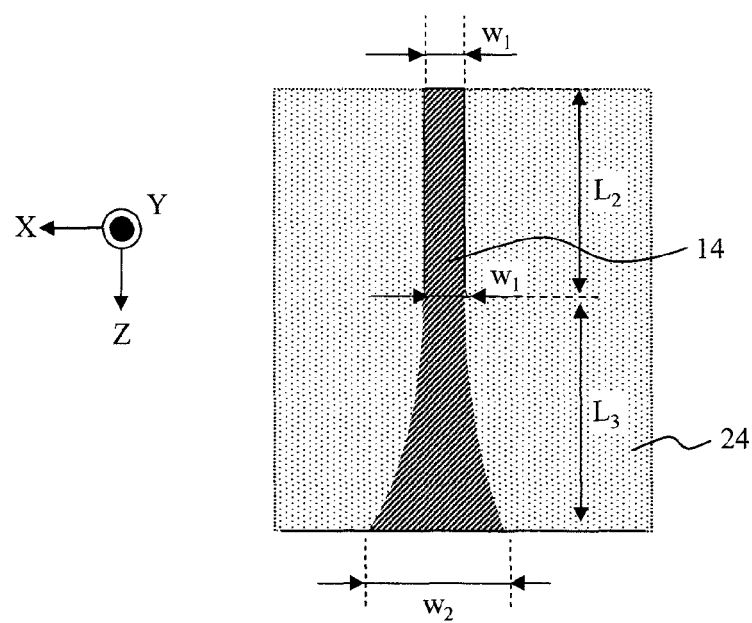
FIG. 16 is a view showing an example of a taper shape enlarging two-dimensionally toward an end thereof.

The shape of the above taper portion may be a shape having a width becoming larger toward the terminating end of the spot size converter as shown in FIG. 16. Further, a similar effect can be obtained even when the taper portion has a taper shape in which the core thickness becomes thinner toward the light incident side similarly with a spot size converter shown in FIG. 6B and FIG. 16 (in this case, the core thickness is a thickness in a Y axis direction).

In this embodiment, light having a wavelength of 760±20 nm is used as the incident light. But, a similar effect can be obtained even with light having a wavelength of 830±20 nm.

In all other embodiments, calculations are made with both 760±20 nm and 830±20 nm as a wavelength of the incident light and linear polarized light in the Y direction as the polarization. And, when the core thickness $t_1$ of the spot size converter is 0.2 micrometers, the thickness $t_2/2$ of the cover layer is defined as 60 nm with respect to a core width $w_1$ of 0.06 micrometers (in this case, Tc/2=84 nm), the thickness $t_2/2$ is defined as 200 nm with respect to a core width w1 of 0.12 micrometers (in this case, Tc/2=168 nm), or the thickness $t_2/2$ is defined as 250 nm with respect to a core width $w_1$ of 0.15 micrometers (in this case, Tc/2=210 nm). Further, when a core width $t_1$ is 0.3 micrometers, the thickness $t_2/2$ of the cover layer is defined as 100 nm with respect to a core width $w_1$ of 0.09 micrometers (in this case, Tc/2=126 nm), the thickness $t_2/2$ of the cover layer is defined as 160 nm with respect to a core width $w_1$ of 0.09 micrometers (in this case, Tc/2=189 nm), the thickness $t_2/2$ of the cover layer is defined as 280 nm with respect to a core width $w_1$ of 0.12 micrometers (in this case, Tc=252 nm), or the thickness $t_2/2$ of the cover layer is defined as 350 nm with respect to a core width $w_1$ of 0.15 micrometers (in this case, Tc/2=315 nm).

Figure 17A:
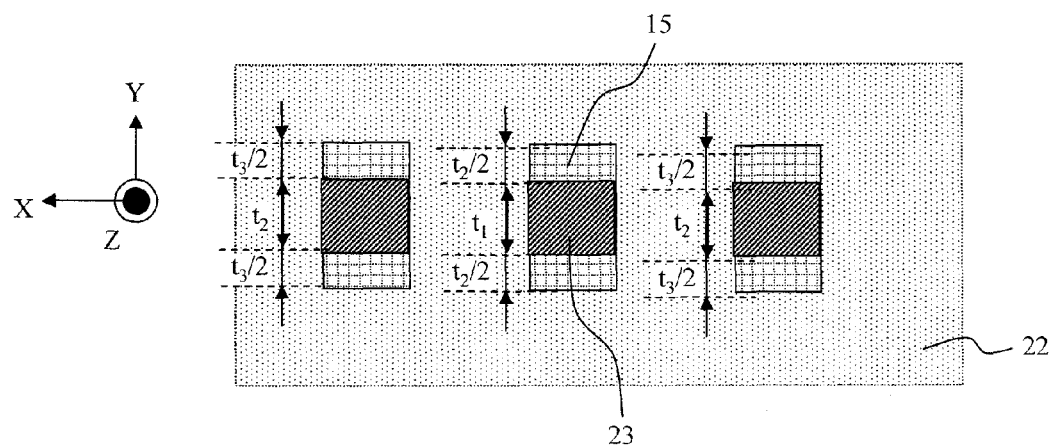
FIG. 17A is a traverse cross sectional view showing an example of a spot size converter in which an additional rectangular portion (bar-shaped core) is formed on both sides of the taper portion.
Figure 17B:
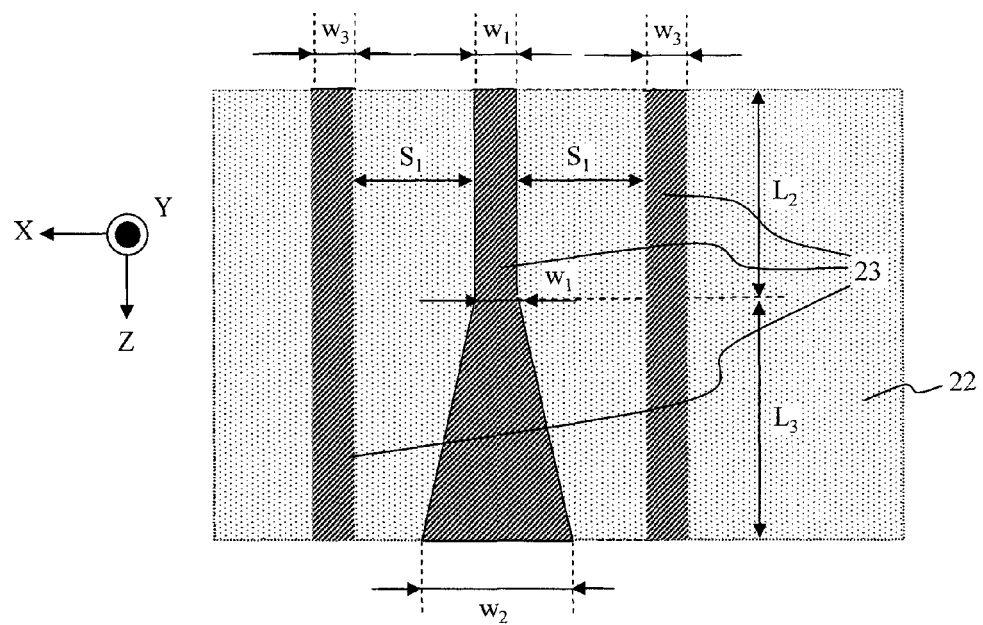
FIG. 17B is a side cross sectional view showing an example of a spot size converter in which an additional rectangular portion (bar-shaped core) is formed on both sides of the taper portion.

In the above embodiment, although a rectangular portion serving to flatten the waveform of light propagating by coupling with incident light 9 is formed only on top of a tip end of a taper portion, an additional rectangular portion (bar-shaped core) may be formed on both sides of the rectangular portion as shown in FIG. 17A and FIG. 17B. FIG. 17A is a cross-sectional view of a spot size converter in a direction vertical to a light propagation direction, FIG. 17B is a cross-sectional view in a direction along the light propagation direction. With bar-shaped cores formed in such a manner, light coupling to and propagating in the bar-shaped cores on both sides can also be coupled to the taper portion, whereby total optical propagation efficiency of the spot size converter can be enhanced. The above bar-shaped cores on both sides need not to be provided on both sides, but a bar-shaped core may be provided on one side only.

To allow light coupling to and propagate in the bar-shaped cores on both sides to couple with the taper portion, the light propagating in the bar-shaped cores on both sides needs to overlap the taper portion. Therefore, a distance s1 between a rectangular portion at the center and a bar-shaped core on each side thereof is preferably not larger than a radius of the spot of light propagating in the rectangular portion (bar-shaped core). The cross sectional shape of the bar-shaped core on both sides needs not to be identical with a shape of the rectangular portion on top of the taper portion. For example, when a core cross sectional area ($w_3 \times t_2$) of the bar-shaped core on both sides is smaller than a core cross sectional area ($w_3 \times t_2$) of the rectangular portion on top of the taper portion, a thickness t3 of a cover layer in the bar-shaped core on both sides is preferably not smaller than a thickness $t_2$ of a cover layer in the rectangular portion on top of the taper portion. When a core cross sectional area ($w_3 \times t_2$) of the bar-shaped core on both sides is larger than a cross sectional area ($w_1 \times t_1$) of the rectangular portion on top of the taper portion, a thickness $t_3$ of a cover layer in the bar-shaped core on both sides is preferably not larger than a thickness $t_2$ of a cover layer in the rectangular portion on top of the taper portion. By forming in such a manner, the spot size of light which can be coupled to and propagated in the bar-shaped core on both sides can be equivalent to a spot size of light which can be coupled to and propagated in a rectangular portion on top of a taper portion, whereby the total optical propagation efficiency of the spot size converter can be improved.

Figure 18:
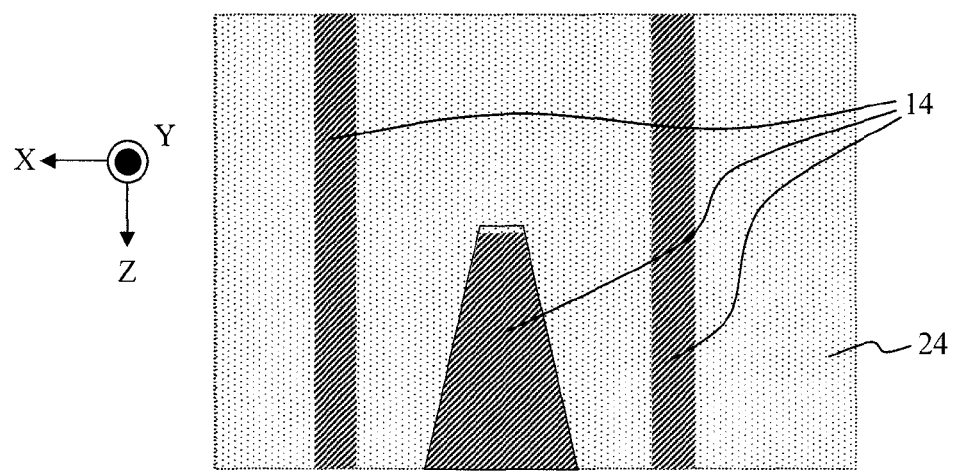
FIG. 18 is a view showing an example of a spot size converter in which a rectangular portion (a bar-shaped core) is formed on both sides of a taper portion and no rectangular portion is formed at an upper part of the taper portion.

With the above bar-shaped core formed on both sides, total optical propagation efficiency equal to or higher than in a configuration example shown in FIG. 6B can be achieved even when the spot size converter has a configuration without a rectangular portion on top of the taper portion as shown in FIG. 18.

Embodiment 2

Next, description is made about a waveguide a portion serving to couple the incident light 9 and flatten the wavefront of the propagating light includes a core and a clad only, but no a rectangular portion in which a cover layer 15 made of a material having a refractive index lower than those of a core 14 and a clad material 24 is formed at upper and lower sides (top and bottom as viewed in Y direction) of the core like Embodiment 1.

Figure 19A:
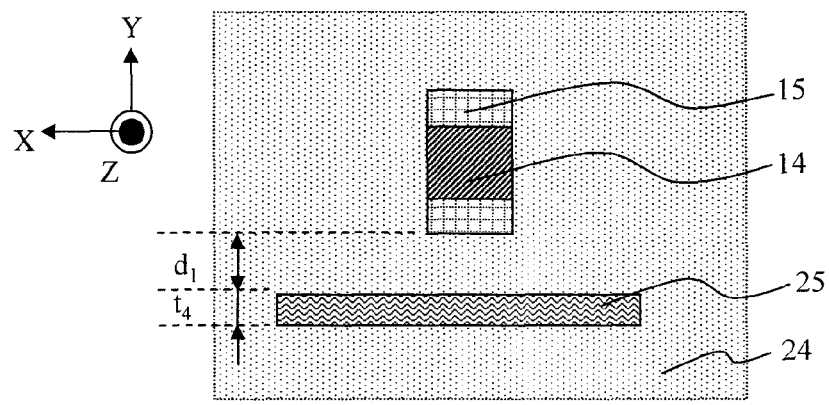
FIG. 19A is a view showing an example of a spot size converter in which a thin core is formed instead of the rectangular portion, as viewed in a direction perpendicular to a light propagation direction.
Figure 19B:
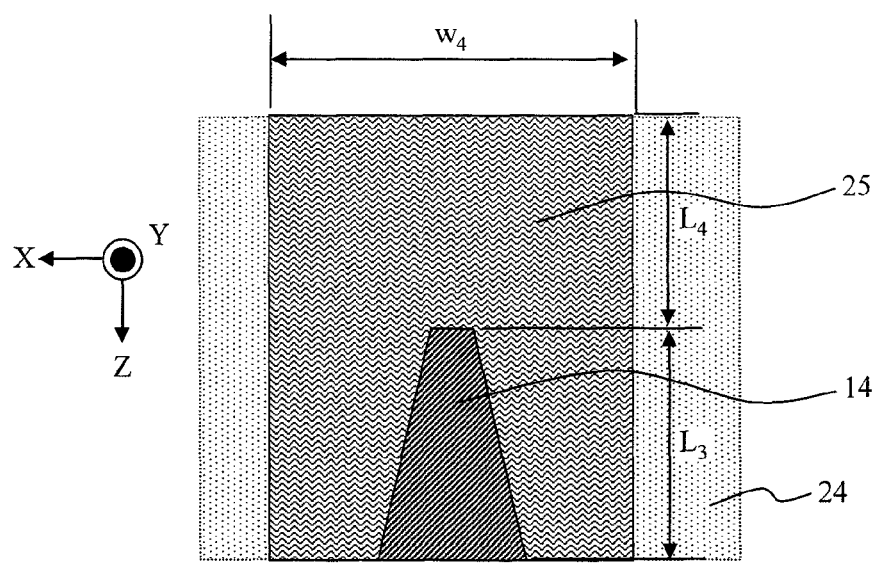
FIG. 19B is a view showing an example of a spot size converter in which a thin core is formed instead of the rectangular portion, as viewed in a direction along a light propagation direction.

FIG. 19A is a cross sectional view of a spot size converter according to the present invention in a direction perpendicular to a light propagation direction, and FIG. 19B is a cross sectional view of the spot size converter in a direction along the light propagation direction. As shown, a thin core 25 may be formed on a side of the light emitting core instead of forming a rectangular portion on top or sides of the taper portion. An optical waveguide comprising a core and a clad and having effects of coupling with the incident light 9 and flattening wavefront of the propagating light is preferably to have a core width or thickness equivalent to or less than a width or a thickness (Ww) to an extent that induces the seeping mode.

Figure 20:
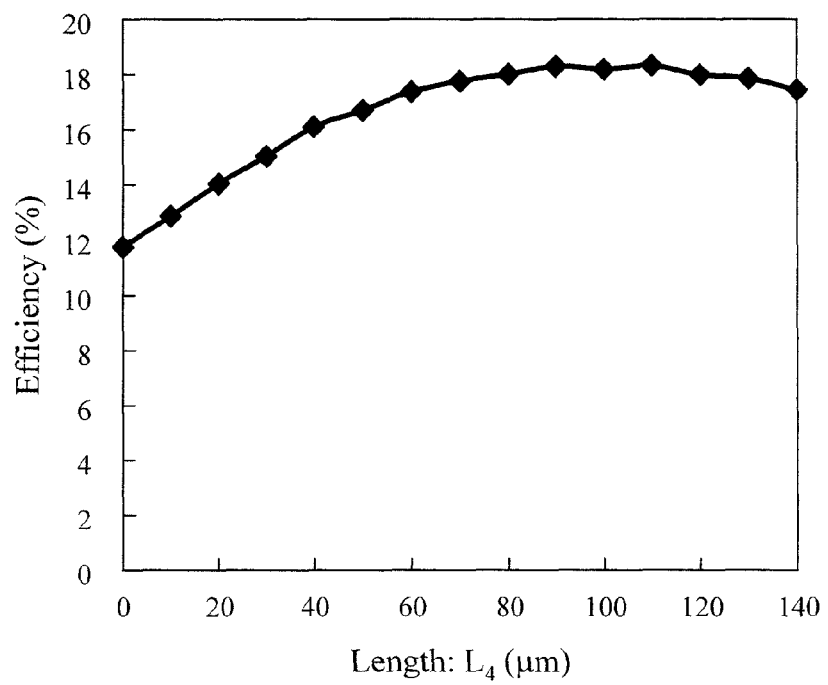
FIG. 20 is a diagram showing a relationship between the thickness of the thin core and the total optical propagation efficiency in a spot size converter shown in FIG. 19A and FIG. 19B.

In this embodiment, a thin core 25 having a width w4 of 5 micrometers and a thickness $t_4$ of 0.2 micrometers and made of a core material of $Al_2O_3$—$Si_3N_4$. Here, a calculation result of the dependency of the total optical propagation efficiency of the spot size converter 13 on the length L4 of the thin core 25 by the BPM method is shown in FIG. 20. The horizontal axis of FIG. 20 shows a length L4 of the thin core 25, and the vertical axis shows the total optical propagation efficiency of the spot size converter. In this calculation, a distance d1 between the thin core 25 and a taper portion is defined as 0 to 0.3 micrometers, and an light incident in the spot size converter is emitted in such a manner that the wavefront of light becomes spherical at a tip end of the spot size converter by freely propagating of alight having the spot light of about 3 micrometers in air (in a medium having a refractive index of 1) in distance of 30 micrometers only. The polarization is a linear polarized light in the Y direction. A length $L_4$+$L_3$ of the spot size converter 13 in a Z direction is 230 micrometers, a length ($L_1$) of the magnetic head.

From FIG. 20, it is apparent that the total optical propagation efficiency becomes maximum when the length $L_4$ of the thin type film is approximately 90 micrometers, about 1.6 times compared when the length L4 of the thin core is 0.0 micrometer. The efficiency when $L_4$ is longer than 90 micrometers is dropped by a spot size conversion loss resulting from shortening of a length $L_2$ of the taper portion serving to reduce the spot size. Accordingly, when there is no limit to the length of the magnetic head, $L_4$ is preferably set to 90 micrometers or longer.

In view of the above, the length $L_4$ of the thin core is defined as 90 micrometers. The length of the thin core 25 needs to extent at least from a surface opposite to ABS of the magnetic field to an inlet portion of the core 14, and preferably extents up to ABS of the magnetic head at maximum. Because, if a length of the thin core 25 does not reach an inlet of the core 14, light propagating in the thin core 25 may be enlarged in the clad material 24 and coupled to the core 14 before coupling therewith, whereby a large light coupling loss occurs and as a result, the total optical propagation efficiency of the spot size converter drops.

Figure 21A:
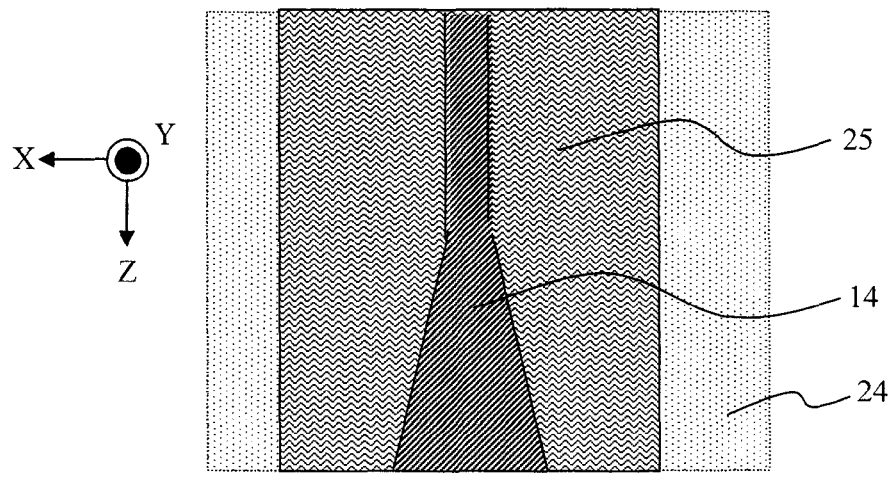
FIG. 21A is a view showing an example of a spot size converter in which a rectangular portion and a thin core are combined together.
Figure 21B:
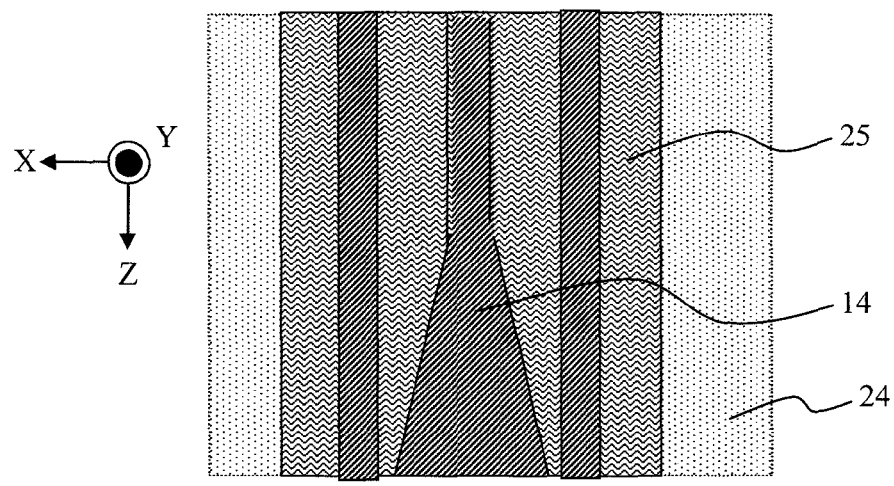
FIG. 21B is a view showing an example of a spot size converter in which a rectangular portion and a thin core are combined together, and is a view showing an example of a rectangular portion (a bar-shaped core) formed on both sides of a taper portion in addition to the thin core and rectangular portion.

In the above embodiment, a thin core 25 is formed instead of a rectangular portion. But, a rectangular portion and a thin core 25 may be formed together as shown in FIG. 21. Further, as shown in FIG. 21B, a rectangular portion and an additional rectangular portion (bar-shaped core) may be formed on sides of the rectangular portion, and a thin core 25 may be formed. By forming in such a manner, light coupling to and propagating in each of the rectangular portions and light coupling to and propagating in the thin core 25 can be coupled to the taper portion, whereby the total optical propagation efficiency of the spot size converter can be enhanced.

Figure 22:
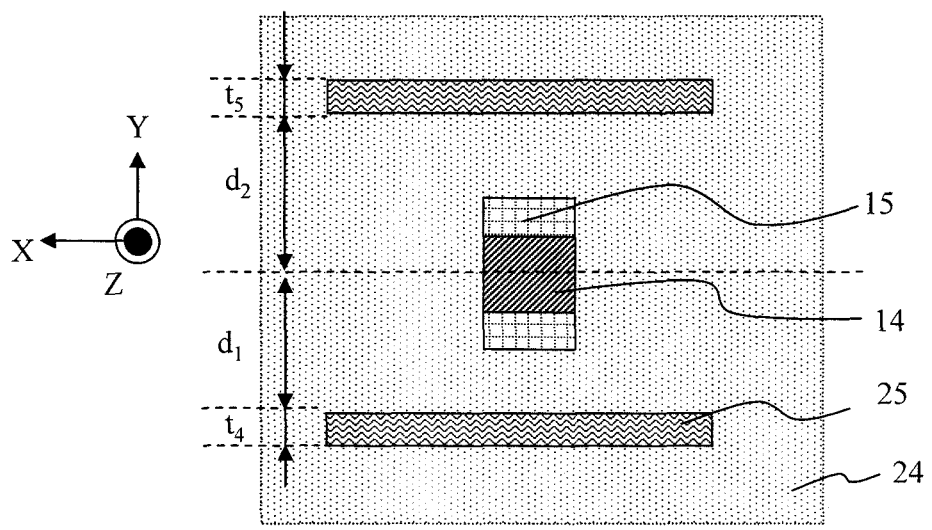
FIG. 22 is a view showing an example of a spot size converter in which a pair of thin cores is formed in such a manner so as to sandwich a rectangular portion and a taper portion.

In the above embodiment, a single thin core 25 is formed. But, as shown in FIG. 22, But, it may be a configuration in which a pair of thin cores 25 sandwiches either or both (hereinafter, referred to as a main core portion) of a rectangular portion and a taper portion in which a cover layer 15 made of a material having a refractive index lower than those of the core 14 and the clad material 24 is formed on top and bottom of the core 14 in the Y direction. By forming in such a manner, light coupling to and entering each of the thin cores 25 can be coupled to the taper portion, whereby the total optical propagation efficiency of the spot size converter can be enhanced.

Figure 23A:
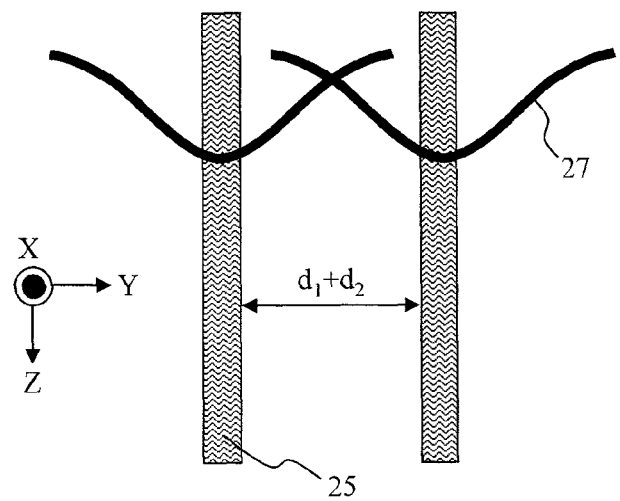
FIG. 23A is a conceptual diagram showing light propagating in two thin cores distanced farther therebetween.
Figure 23B:
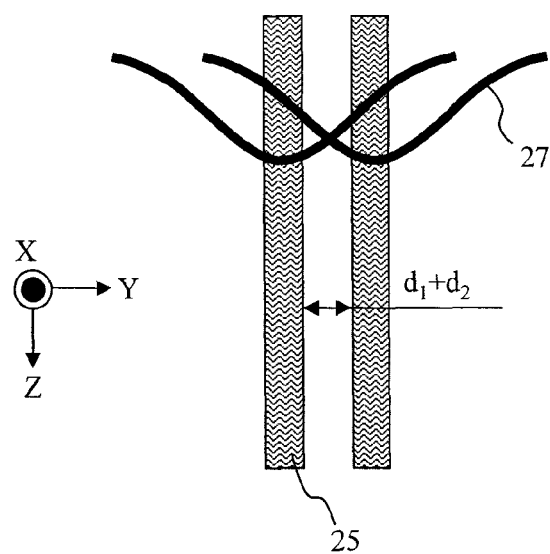
FIG. 23B is c conceptual diagram showing light propagating in two thin cores distanced closer therebetween.

A principle thereof is briefly described with reference to FIG. 23A, FIG. 23B, FIG. 24A and FIG. 24B. FIG. 23A and FIG. 23B are cross sectional views of two thin cores viewed from Y and Z surfaces, and schematic views illustrating the intensity profile (light spot) of light propagating in two thin film type cores of a same shape When light is emitted into two thin cores 25, the light spot 27 shown in the figures propagates along each of the thin cores 25. When an interval $d_1+d_2$ between the cores is small as shown in FIG. 23B, light spots 27 overlap each other having a substantially same intensity distribution as one light spot, whereby the coupling efficiency of two thin cores 25 and incident light becomes almost same as an efficiency of one thin core. However, when the interval $d_1+d_2$ is large as shown in FIG. 23A with a distance sufficiently apart from each other, the coupling efficiency becomes equivalent to light propagating in each of the two thin cores. Thus, as a result, the coupling efficiency can be made about twice when compared with a small interval $d_1+d_2$.

Figure 24A:
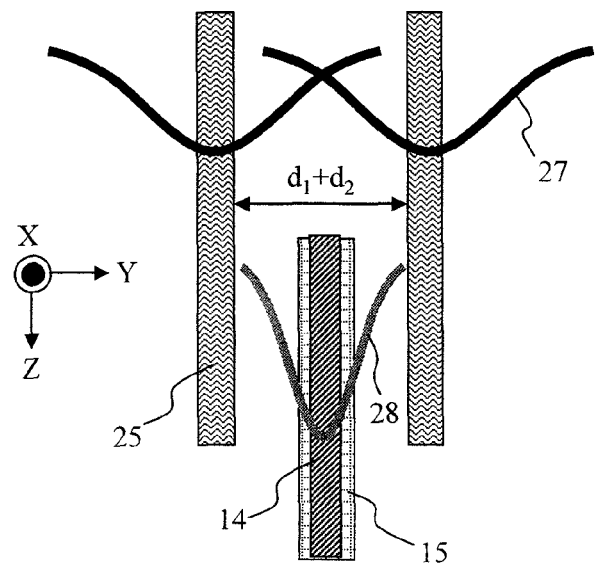
FIG. 24A is a conceptual diagram illustrating light coupling from two thin cores to a location above the taper portion in the case the two thin cores are distanced farther therebetween.
Figure 24B:
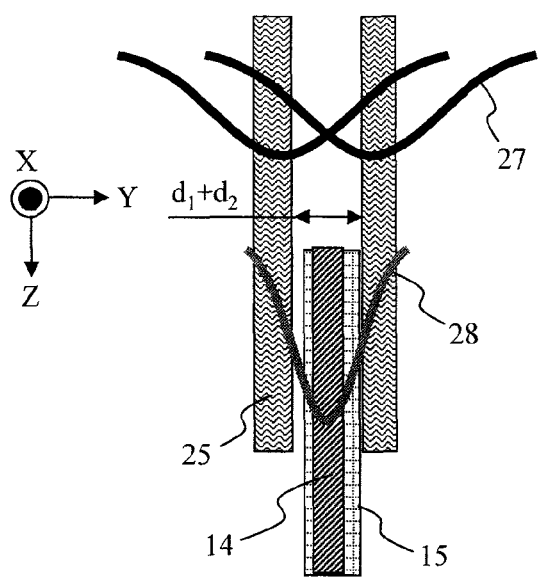
FIG. 24B is a conceptual diagram illustrating light coupling from two thin cores to a location above the taper portion in the case the two thin cores are distanced closer therebetween.

But, as the interval $d_1+d_2$ becomes larger, a coupling efficiency between light propagating in two thin cores and the main core decreases due to a mismatching of the intensity profile between light propagating in two thin cores and light propagating in the main core. FIG. 24A and FIG. 24B are cross sectional views of the spot size converter as viewed in the YZ plane, schematically showing the intensity profile (light spot 28) of light propagating in the thin core 25 and light propagating in an upper part of the main core. When an interval $d_1+d_2$ between the cores is small as shown in FIG. 24B, an intensity profile of light 27 propagating in two thin cores and that of light 28 propagating in an upper part of the main core are close to each other, so that the light can couple to the main core with high efficiency. On the other hand, when the interval $d_1+d_2$ between the cores is large as shown in FIG. 24A, there is a great difference in the intensity profile, causing a drop in the coupling efficiency.

Figure 25:
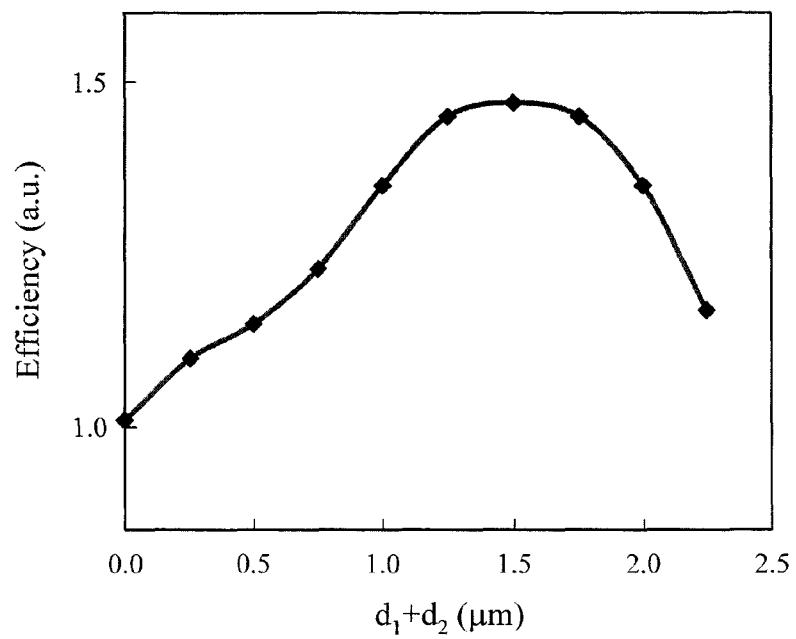
FIG. 25 is a diagram showing a relationship between the distance between the rectangular portion of a thin core and the taper portion and the total optical propagation efficiency in the spot size converter shown in FIG. 24A and FIG. 24B.

Thus, in order to obtain a maximum total optical propagation efficiency, a relationship between the total optical propagation efficiency of a spot size converter using two thin cores 25 and a main core and the interval $d_1+d_2$ is calculated by using the BPM method. FIG. 25 is a calculation result thereof. The total optical propagation efficiency shown by the vertical axis is standardized with a utilization efficiency of one thin core as 1. With an interval $d_1+d_2$ of about 1.2 to 1.8 micrometers, the total optical propagation efficiency could be enhanced to 1.3 times or more of that in the case of using a single thin core. In this case, a half width of the spot size in the Y direction of light propagating along a thin core is approximately 1.1 to 2.2 micrometers.

Accordingly, it is apparent that $d_1$ ($=d_2$) is a value just corresponding to a half of the half width of the spot size in the Y direction of light propagating along the thin core 25±20%. Therefore, a distance $d_1$ ($=d_2$) between the main core and the thin core 25 is preferably a half of the half width of the spot size in the Y direction of light propagating along the thin core 25±20%, that is, within a value between 80% and 120%. Thus, in this embodiment, the interval $d_1+d_2$ is defined as 1.5 micrometers or 1.7 micrometers. If width, thickness and delta-n of the thin core are given, a half width of the spot size in the Y direction of light propagating in the vicinity of the thin core can be derived by using the BPM method.

Although in the above embodiment, two thin cores 25 are substantially identical, width, thickness and delta-n of respective thin cores may be different, provided that d1 and d2 are not larger than a half value of the half width of the spot size in the Y direction of light propagating along each of the thin cores ±20%.

Figure 26:
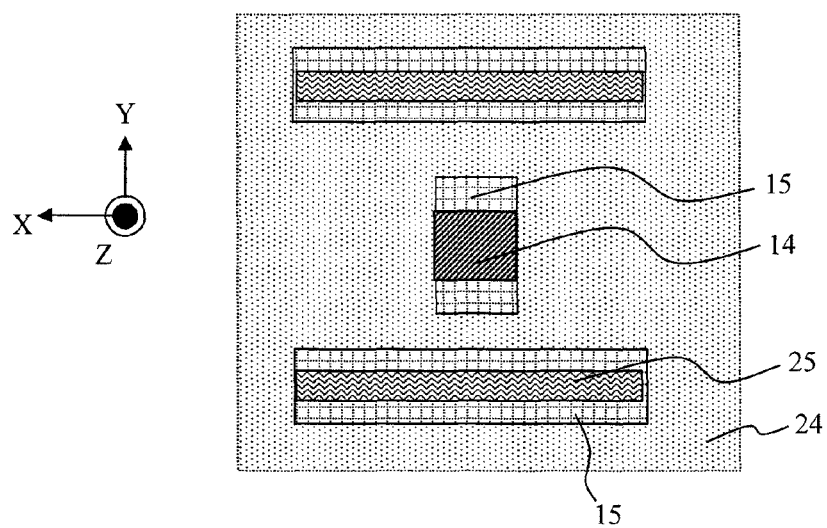
FIG. 26 is a view showing an example of a spot size converter having a cover layer between a thin core and a clad material.

Instead of thin cores used in the above embodiment, a thin core in which a cover layer 15 made of a material having a refractive index lower than those of the core 25 and the clad material 24 is formed between top and bottom of the core in the Y direction and between the core 25 and the clad material 24 as shown in FIG. 26 may be used. By forming in such a manner, the thin core can couple with incident light 9 having a larger spot size, whereby the total optical propagation efficiency of the spot size converter can be enhanced.

EXPLANATION OF THE REFERENCE NUMERALS

1 Housing
2 Spindle
3 Magnetic recording medium
4 Optical source
5 Magnetic head
6 Suspension
7 Voice coil motor
8 Signal processing LSI
9 Incident light
10 Laser diode
11 Sub-mount
12 Light transmission hole
13 Spot size converter
14 Core
15 Cover layer
16 Magnetic head bottom
17 Optical near-field transducer
18 Thin film coil
19 Magnetic main pole
20 Magnetic return pole
21 Magnetic reproducing element
22 Shield
23 Magnetic head base metal
24 Clad material
25 Thin core
26 Light intensity profile
27 light spot propagating in thin core
28 light spot propagating in main core

The invention claimed is:

1. A thermal-assisted-magnetic-recording head characterized in that
the thermal-assisted-magnetic-recording head comprises: a magnetic main pole configured to generate a write magnetic field, a magnetic return pole, a magnetic reproducing element, a shield formed around the magnetic reproducing element, and a spot size converter including a clad and a core configured to emit light from an optical source as a fine light spot from a position adjacent to the magnetic main pole on an air bearing surface side, and
at least one side surface of the core is covered with a cover layer having a refractive index lower than those of the core and the clad,
wherein thickness of the cover layer is within a range of ±30% of Tc, the TC is expressed in a formula shown below:

$$Tc = \frac{A \cdot t_1}{Ww}$$

where;
A is defined by:

$$n_1 \cdot t_1 + n_3 \cdot A = n_2 \cdot (t_1 + A)$$

$n_1$: refractive index of core material
$n_2$: refractive index of clad material
$n_3$: refractive index of cover layer
$t_1$: thickness of core
Ww: approximate width or thickness that induces the seeping mode expressed in a formula shown below:

$$Ww = \frac{\pi}{2\pi \cdot n_1 \cdot \sin\theta_1 / \lambda}$$

where $\theta_1$ is represents a critical angle of the light at an interface between the core and the clad and can be expressed with a formula shown below:

$$\theta_1 = \sin^{-1}\left(\frac{\sqrt{n_1^2 - n_2^2}}{n_1}\right)$$

where;
$\lambda$: wavelength of light in vacuum
$n_1$: refractive index of core material
$n_2$: refractive index of clad material.

2. The thermal-assisted-magnetic-recording head according to claim 1, characterized in that a width and/or thickness of the core over a predetermined length from a light incident end is at least not larger than a width and/or thickness that induce a seeping mode.

3. The thermal-assisted-magnetic-recording head according to claim 1, characterized in that the core includes a portion having a width and a thickness not substantially changing in a light traveling direction, and a portion in a taper shape having a width and/or thickness increasing in a light traveling direction.

4. The thermal-assisted-magnetic-recording head according to claim 1, characterized in that a plurality of bar-shaped cores having a width and a thickness not substantially changing in a light traveling direction is provided on sides of the core, and at least one side of the bar-shaped cores is covered with a cover layer having a refractive index lower than those of the bar-shaped cores and the clad.

5. The thermal-assisted-magnetic-recording head according to claim 1, characterized in that the thermal-assisted-magnetic-recording head comprises an additional core provided on a side of the core, having a width and/or thickness smaller than a width and/or thickness that induce a seeping mode and configured to guide light from an optical source into a magnetic head.

6. A thermal-assisted-magnetic-recording head characterized in that
the thermal-assisted-magnetic-recording head comprises:
a magnetic main pole configured to generate a write magnetic field, a magnetic return pole, a magnetic reproducing element, a shield formed around the magnetic reproducing element, and a spot size converter including a clad and a core configured to emit light from an optical source as a fine light spot from a position adjacent to the magnetic main pole on an air bearing surface side, and
at least one side surface of the core is covered with a cover layer having a refractive index lower than those of the core and the clad, characterized in that
the thermal-assisted-magnetic-recording head comprises a plurality of thin cores provided on sides of the core, having a thickness that is not larger than a thickness that induces a seeping mode, and configured to guide light from the optical source into a magnetic head, and
a distance between the plurality of thin cores is 80% to 120%, both inclusive, of a half value of the half width of the spot size of light propagating in each of the thin cores.

7. The thermal-assisted recording magnetic medium according to claim 1, characterized in that a width of the core becomes narrower as the core extends further apart from the air bearing surface.

8. The thermal-assisted-magnetic-recording head according to claim 1, characterized in that an optical near-field generator is provided on the air bearing surface side of the spot size converter.

9. A magnetic recording system characterized in that
the magnetic recording system comprises a magnetic recording medium, a medium driver configured to drive the magnetic recording medium, a magnetic head comprising a recording element and a read element, and a magnetic head driver configured to position the magnetic head above the magnetic recording medium,
the magnetic head includes a magnetic main pole configured to generate a write magnetic field, a magnetic return pole, a magnetic reproducing element, a shield formed around the magnetic reproducing element, and a spot size converter comprising a clad and a core configured to emit light from an optical source as a fine light spot from a position adjacent to the magnetic main pole on an air bearing surface side, and
at least one side of the core is covered with a cover layer having a refractive index lower than those of the core and the clad,
wherein thickness of the cover layer is within a range of ±30% of Tc, the TC is expressed in a formula shown below:

$$Tc = \frac{A \cdot t_1}{Ww}$$

where;
A is defined by:
$$n_1 \cdot t_1 + n_3 \cdot A = n_2 \cdot (t_1 + A)$$
$n_1$: refractive index of core material
$n_2$: refractive index of clad material
$n_3$: refractive index of cover layer
$t_1$: thickness of core
Ww: approximate width or thickness that induces the seeping mode expressed in a formula shown below:

$$Ww = \frac{\pi}{2\pi \cdot n_1 \cdot \sin\theta_1 / \lambda}$$

where $\theta_1$ is represents a critical angle of the light at an interface between the core and the clad and can be expressed with a formula shown below:

$$\theta_1 = \sin^{-1}\left(\frac{\sqrt{n_1^2 - n_2^2}}{n_1}\right)$$

where;
$\lambda$: wavelength of light in vacuum
$n_1$: refractive index of core material
$n_2$: refractive index of clad material.

* * * * *